(12) United States Patent
Haneda et al.

(10) Patent No.: US 10,175,044 B2
(45) Date of Patent: Jan. 8, 2019

(54) CIRCUIT DEVICE, PHYSICAL QUANTITY DETECTION DEVICE, ELECTRONIC APPARATUS, AND MOVING OBJECT

(71) Applicant: Seiko Epson Corporation, Tokyo (JP)

(72) Inventors: Hideo Haneda, Matsumoto (JP); Yasuhiro Sudo, Chino (JP)

(73) Assignee: Seiko Epson Corporation (JP)

( * ) Notice: Subject to any disclaimer, the term of this patent is extended or adjusted under 35 U.S.C. 154(b) by 195 days.

(21) Appl. No.: 15/044,332

(22) Filed: Feb. 16, 2016

(65) Prior Publication Data

US 2016/0245651 A1    Aug. 25, 2016

(30) Foreign Application Priority Data

Feb. 20, 2015    (JP) ................................ 2015-031649

(51) Int. Cl.
*G01C 19/56*      (2012.01)
*G01C 19/5614*    (2012.01)

(52) U.S. Cl.
CPC .............................. *G01C 19/5614* (2013.01)

(58) Field of Classification Search
None
See application file for complete search history.

(56) References Cited

U.S. PATENT DOCUMENTS

| 4,255,789 A | 3/1981 | Hartford et al. | |
|---|---|---|---|
| 5,530,505 A * | 6/1996 | Ohishi | G03B 17/00 348/E5.046 |
| 6,356,836 B1 * | 3/2002 | Adolph | G01C 21/26 701/410 |
| 6,516,021 B1 * | 2/2003 | Abbott | G01S 19/26 342/108 |
| 7,150,561 B1 * | 12/2006 | D'Aquino | G01K 7/015 374/178 |
| 7,352,305 B2 * | 4/2008 | Kiriyama | G01D 5/24404 341/111 |
| 8,164,514 B1 * | 4/2012 | Yang | G01S 5/0273 342/357.28 |
| 8,429,217 B2 * | 4/2013 | Schmookler | G06F 7/535 708/495 |

(Continued)

FOREIGN PATENT DOCUMENTS

| JP | 05-288559 A | 11/1993 |
|---|---|---|
| JP | 06-012913 U | 2/1994 |

(Continued)

OTHER PUBLICATIONS

U.S. Appl. No. 14/044,217, dated Feb. 16, 2016, Hideo Haneda et al.

*Primary Examiner* — Michael Lebentritt
(74) *Attorney, Agent, or Firm* — Harness, Dickey & Pierce, P.L.C.

(57) ABSTRACT

A circuit device includes a detection circuit which outputs angular velocity information, based on a detection signal from an angular velocity sensor element; and an output unit which outputs rotation number information of fixed-point notation that is obtained based on the angular velocity information. The output unit can output an integer part of the rotation number information as an integer part of the fixed-point notation, and can output a decimal part of the rotation number information as a decimal part of the fixed-point notation.

19 Claims, 16 Drawing Sheets

(56) References Cited

U.S. PATENT DOCUMENTS

| | | | |
|---|---|---|---|
| 8,434,036 B2* | 4/2013 | Hasegawa | G06F 17/504 716/100 |
| 8,489,663 B2* | 7/2013 | Wang | G06F 7/485 708/501 |
| 8,754,951 B2* | 6/2014 | Hirayama | G03B 13/36 348/208.2 |
| 9,658,065 B2 | 5/2017 | Tsutsumi | |
| 9,746,326 B2 | 8/2017 | Fujii et al. | |
| 2002/0014675 A1* | 2/2002 | Matsumoto | G01K 7/01 257/470 |
| 2006/0088338 A1 | 4/2006 | Matsuda et al. | |
| 2007/0146180 A1* | 6/2007 | Tsuchiya | H03M 1/207 341/119 |
| 2008/0148847 A1 | 6/2008 | Sato et al. | |
| 2011/0061461 A1 | 3/2011 | Yoshida | |
| 2011/0062941 A1 | 3/2011 | Yoshida | |
| 2011/0080227 A1 | 4/2011 | Aoyama et al. | |
| 2011/0179868 A1 | 7/2011 | Kaino et al. | |
| 2011/0179872 A1 | 7/2011 | Kaino et al. | |
| 2012/0191398 A1 | 7/2012 | Murakami et al. | |
| 2012/0221584 A1* | 8/2012 | Williamson | G06F 17/30914 707/756 |
| 2012/0242848 A1 | 9/2012 | Hirayama | |
| 2014/0070077 A1 | 3/2014 | Tsuchimoto et al. | |
| 2014/0247072 A1* | 9/2014 | Liu | G06F 1/14 327/115 |
| 2014/0318244 A1 | 10/2014 | Tsutsumi | |
| 2014/0324375 A1 | 10/2014 | Seo | |
| 2014/0324392 A1 | 10/2014 | Ogihara | |
| 2015/0149848 A1* | 5/2015 | Haneda | G05B 19/0423 714/746 |
| 2015/0160011 A1 | 6/2015 | Nakajima et al. | |
| 2015/0160012 A1 | 6/2015 | Il et al. | |
| 2015/0268107 A1 | 9/2015 | Nishizawa et al. | |
| 2015/0301074 A1 | 10/2015 | Yonezawa et al. | |
| 2016/0169675 A1 | 6/2016 | Shindo | |
| 2016/0169717 A1 | 6/2016 | Zhitomirsky | |
| 2016/0187136 A1 | 6/2016 | Murakami et al. | |
| 2016/0245652 A1* | 8/2016 | Haneda | G01C 19/5614 |
| 2016/0282116 A1* | 9/2016 | Haneda | H03K 5/13 |
| 2016/0290804 A1* | 10/2016 | Cassagnes | G01C 19/5726 |
| 2016/0290828 A1 | 10/2016 | Oshio et al. | |
| 2016/0294397 A1* | 10/2016 | Haneda | H03L 7/085 |
| 2016/0313124 A1 | 10/2016 | Oshio | |
| 2016/0320187 A1* | 11/2016 | Higuchi | G01K 7/20 |
| 2016/0335885 A1 | 11/2016 | Aoyama et al. | |
| 2017/0059320 A1 | 3/2017 | Sugimoto et al. | |

FOREIGN PATENT DOCUMENTS

| | | |
|---|---|---|
| JP | 2000-221039 A | 8/2000 |
| JP | 2004-239907 A | 8/2004 |

* cited by examiner

| Bit | 39 | 38 | 37 | ... | 26 | 25 | 24 | 23 | 22 | 21 | 20 | 19 | ... | 5 | 4 | 3 | 2 | 1 | 0 |
|---|---|---|---|---|---|---|---|---|---|---|---|---|---|---|---|---|---|---|---|
| MEANING | INTEGER PART REVQ[15:0] | | | | | | | DECIMAL PART DEGQ[23:0] | | | | | | | | | | | |
| THE NUMBER OF ROTATIONS WITH SIGN | 40 bits WITH SIGN FIXED-POINT DECIMAL PART 24 bits | | | | | | | | | | | | | | | | | | |
| ANGLE: $-180 \leq \theta < 180$ | X | | | | | | | 24 bits WITH SIGN INTEGER PART × 360/$2^{24}$ | | | | | | | | | | | |
| ANGLE: $0 \leq \theta < 360$ | X | | | | | | | 24 bits WITHOUT SIGN INTEGER PART × 360/$2^{24}$ | | | | | | | | | | | |

FIG. 2A

| REGISTER SETTING | THE NUMBER OF READ BYTES | | | | |
|---|---|---|---|---|---|
| | 1byte | 2byte | 3byte | 4byte | 5byte |
| QCA[1:0] | | | | | |
| 00(FIRST OUTPUT MODE) | REVQ[15:8] | REVQ[7:0] | DEGQ[23:16] | DEGQ[15:8] | DEGQ[7:0] |
| 01(FOURTH OUTPUT MODE) | DEGQ[23:16] | DEGQ[15:8] | DEGQ[7:0] | | |
| 10(THIRD OUTPUT MODE) | DEGQ[23:16] | DEGQ[15:8] | | | |
| 11(SECOND OUTPUT MODE) | REVQ[15:8] | REVQ[7:0] | | | |

| ADDRESS | REGISTER NAME | R/W | FUNCTION |
|---------|---------------|-----|----------|
| . . . | . . . | . . . | . . . |
| ADX | MCTL | R/W | SETTING OF ARITHMETIC PROCESSING UNIT |
| . . . | . . . | . . . | . . . |
| ADY | RDAG | R | READ INFORMATION |
| ADZ | AGRS | C | RESET INTEGRATION PROCESSING UNIT |
| . . . | . . . | . . . | . . . |

R: READ REGISTER
R/W: READ REGISTER AND WRITE REGISTER
C: DESIGNATE ADDRESS (COMMAND)

FIG. 3B

| ADDRESS | Bit | REGISTER NAME | INITIAL VALUE | R/W | FUNCTION | SETTING CONTENT |
|---------|-----|---------------|---------------|-----|----------|-----------------|
| ADX | 7 | . . . | . . . | . . . | . . . | . . . |
| | 6 | | | | | |
| | 5 | | | | | |
| | 4 | | | | | |
| | 3 | | | | | |
| | 2 | QCA[1] | 0 | R/W | OUTPUT MODE SETTING | 00: READ 40 bits<br>01: READ 16 bits (ANGLE)<br>10: READ 24 bits (ANGLE)<br>11: READ 16 bits (THE NUMBER OF ROTATIONS) |
| | 1 | QCA[0] | 0 | R/W | | |
| | 0 | ENBAG | 0 | R/W | ENABLE ARITHMETIC PROCESSING UNIT | 0:Disable 1:Enable |

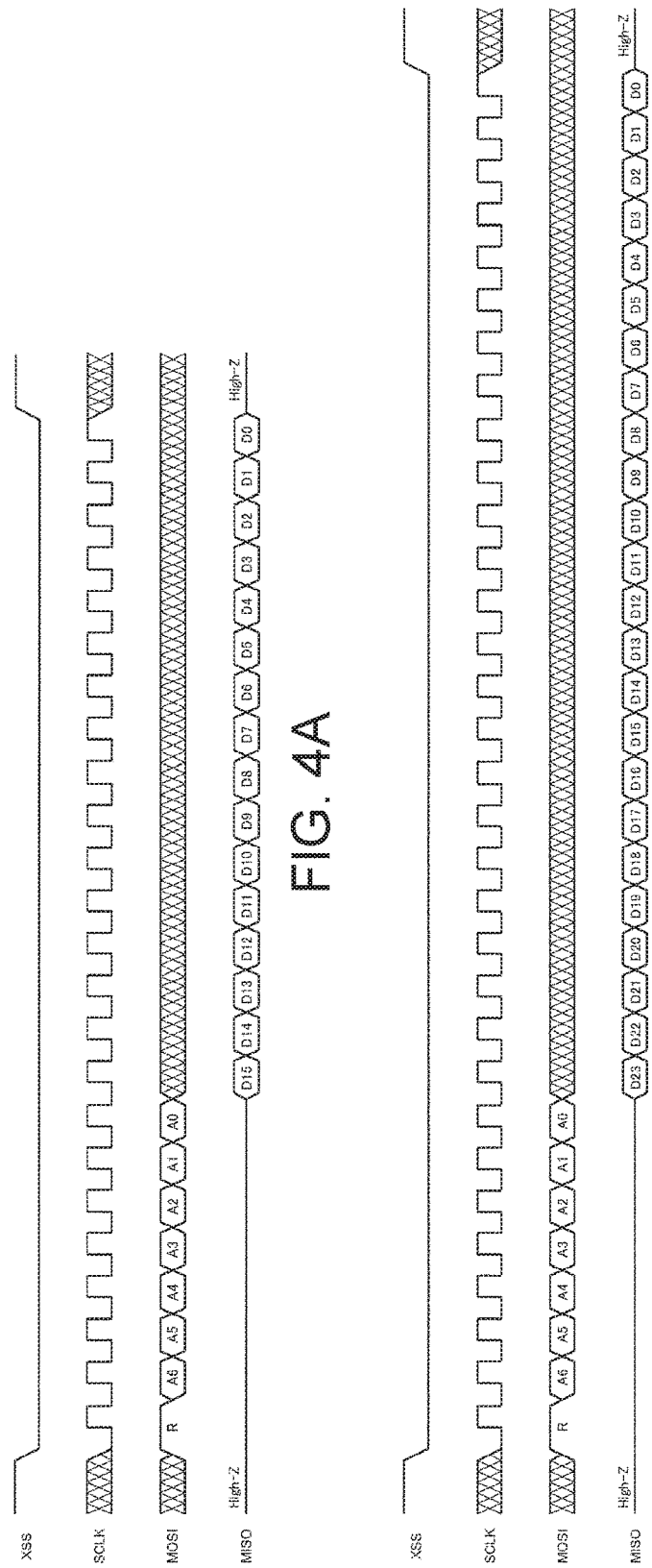

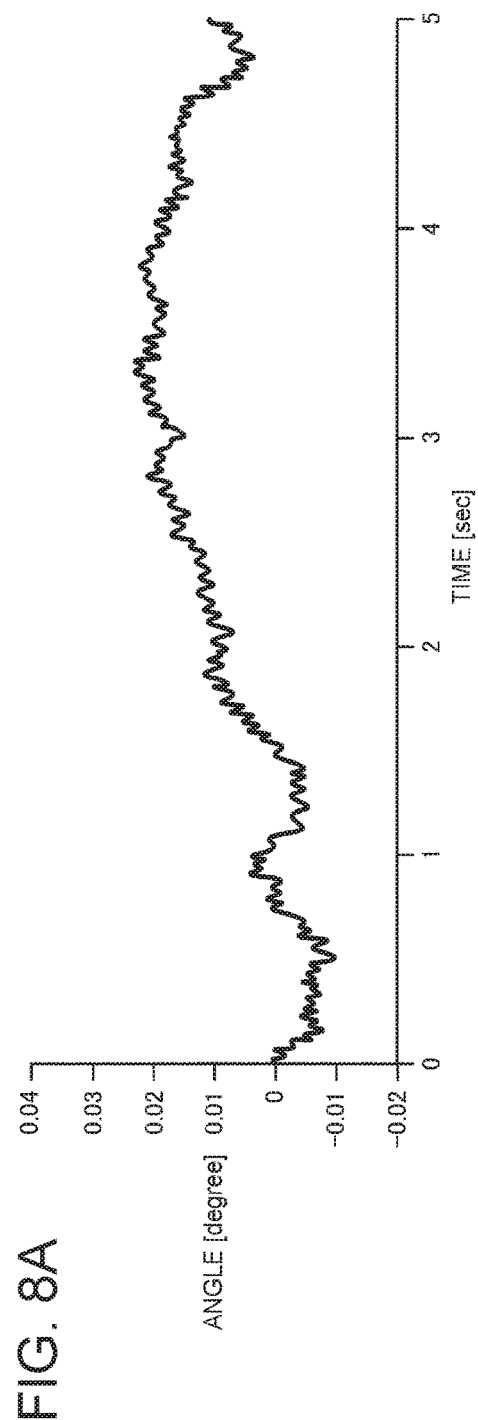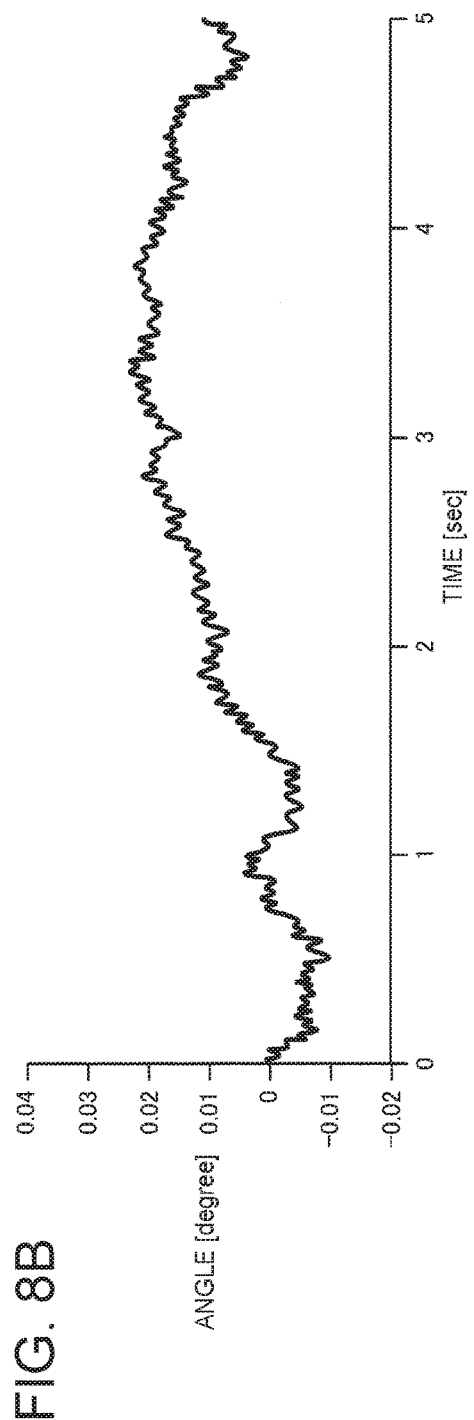

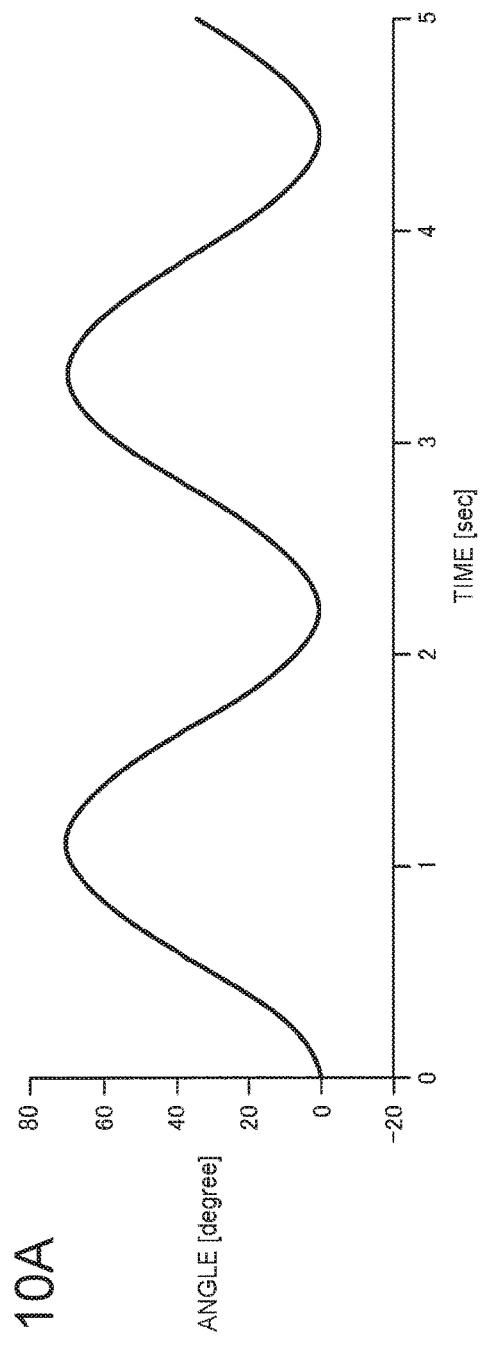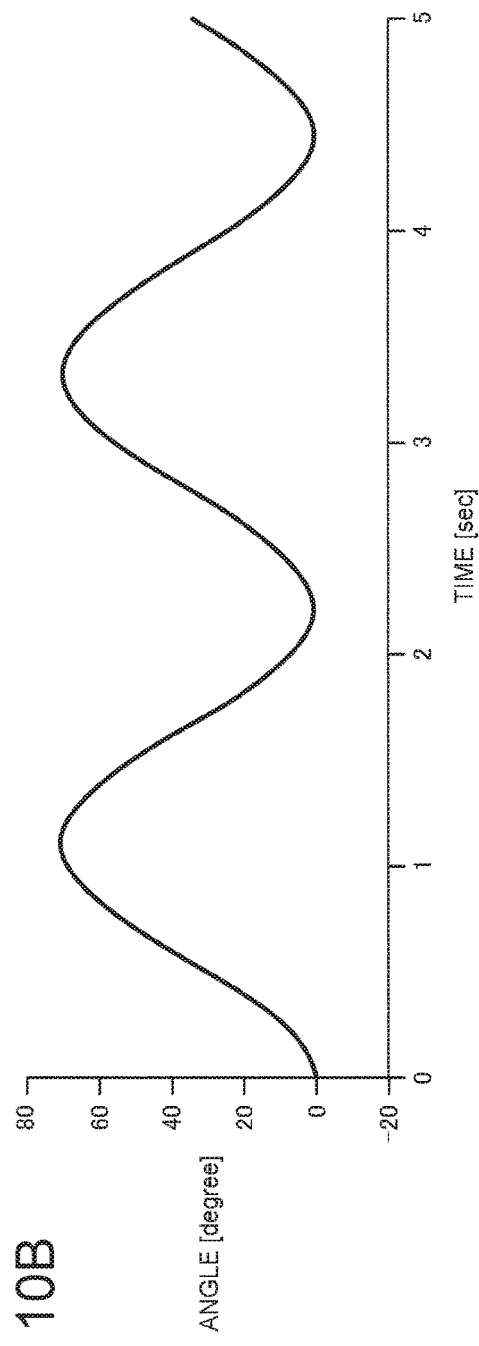

CIRCUIT DEVICE, PHYSICAL QUANTITY DETECTION DEVICE, ELECTRONIC APPARATUS, AND MOVING OBJECT

BACKGROUND

1. Technical Field

The present invention relates to a circuit device, a physical quantity detection device, an electronic apparatus, a moving object, and the like.

2. Related Art

A circuit device for detecting a physical quantity based on a detection signal from a physical quantity transducer is already known. For example, in a gyro sensor, a circuit device detects angular velocity or the like based on a detection signal from a vibrating reed which is a physical quantity transducer. The gyro sensor is built into, for example, an electronic apparatus such as a digital camera or a smart phone, or a moving object such as a vehicle or an airplane, and performs hand shake correction, posture control, GPS autonomous navigation, or the like, using a physical quantity such as angular velocity which is detected.

A related art of a circuit device of the gyro sensor is disclosed in, for example, JP-A-2004-239907.

In JP-A-2004-239907, a method of obtaining angle information by performing integration processing of digital yaw rate information (angular velocity information) in a MEMS yaw rate sensor (MEMS gyro sensor) is disclosed. Then, a point in which the obtained angle information is output as digital data of 0 degrees to 360 degrees (maximum angle) is also disclosed.

According to the related art of JP-A-2004-239907, a rotation angle of 0 degrees to 360 degrees can be output. However, for example, if information on the number of rotations of a detection target needs to be obtained, processing such as performing multiplication processing of a rotation angle which is output from a MEMS yaw rate sensor, using an external processing device is required.

In addition, a physical quantity detection device such as a gyro sensor is used for obtaining a rotation angle of less than one rotation, and is also used for obtaining information on the number of rotations of a detection target, and it is preferable that the physical quantity detection device can output information with high convenience in correspondence to various applications.

SUMMARY

An advantage of some aspects of the invention is that a circuit device, a physical quantity detection device, an electronic apparatus, a moving object, and the like, which can output rotation number information based on angular velocity information at an output aspect of high convenience, are provided.

The invention can be implemented as the following forms or aspects.

An aspect of the invention relates to a circuit device including a detection circuit which outputs angular velocity information, based on a detection signal from an angular velocity sensor element; and an output unit which outputs rotation number information of fixed-point notation that is obtained based on the angular velocity information, in which the output unit can output an integer part of the rotation number information as an integer part of the fixed-point notation, and can output a decimal part of the rotation number information as a decimal part of the fixed-point notation.

In the aspect of the invention, the detection circuit outputs angular velocity information based on the detection signal from the angular velocity sensor element. Then, the output unit can output the integer part of the rotation number information obtained based on the angular velocity information as the integer part of the fixed-point notation, and can output the decimal part of the rotation number information as the decimal part of the fixed-point notation. In this way, the output unit can output the integer part of the rotation number information or the decimal part of the rotation number information as fixed-point notation. Hence, it is possible to provide a circuit device which can output the rotation number information based on the angular velocity information in a state of an output with high convenience.

In the aspect of the invention, the output unit may include multiple output modes, and the multiple output modes include a first output mode in which the output unit outputs the integer part of the rotation number information and the decimal part of the rotation number information.

According to this configuration, for example, it is possible to realize an output mode corresponding to an application which requires both the integer part of the rotation number information and the decimal part of the rotation number information.

In the aspect of the invention, the multiple output modes may include a second output mode in which the output unit outputs the integer part of the rotation number information, and the output unit does not output the decimal part of the rotation number information.

According to this configuration, for example, it is possible to realize an output mode corresponding to an application which requires the integer part of the rotation number information, but does not require the decimal part of the rotation number information.

In the aspect of the invention, the multiple output modes may include a third output mode in which the output unit does not output the integer part of the rotation number information, and the output unit outputs the decimal part of the rotation number information.

According to this configuration, for example, it is possible to realize an output mode corresponding to an application which requires the decimal part of the rotation number information, but does not require the integer part of the rotation number information.

In the aspect of the invention, the multiple output modes may include a fourth output mode in which the number of bits of the decimal part of the rotation number information is reduced and is output by the output unit.

According to this configuration, for example, it is possible to realize an output mode corresponding to an application which requires the decimal part of the rotation number information, but does not require accuracy thereof so much.

In the aspect of the invention, the output unit may include multiple output modes, and the multiple output modes may include at least two output modes, among a first output mode in which the output unit outputs the integer part of the rotation number information and the decimal part of the rotation number information, a second output mode in which the output unit outputs the integer part of the rotation number information, and the output unit does not output the decimal part of the rotation number information, a third output mode in which the output unit does not output the integer part of the rotation number information, and the output unit outputs the decimal part of the rotation number information, and a fourth output mode in which the number of bits of the decimal part of the rotation number information is reduced and is output by the output unit.

According to this configuration, the output unit can output the rotation number information in at least two output modes among the first, second, third, and fourth output modes. Hence, it is possible to provide a circuit device which can output rotation number information in an output aspect which can correspond to various applications.

In the aspect of the invention, the circuit device may further include a register unit, and the register unit may include a mode switching register which switches the multiple output modes.

According to this configuration, for example, an external processing device or the like switches the output mode by accessing the mode switching register, and thus it is possible to cause the output unit to output rotation number information in an output aspect which can correspond to various applications.

In the aspect of the invention, the circuit device may further include a register unit and a control unit, the register unit may include an information register which stores the rotation number information, and the control unit may perform processing of reading the rotation number information from the information register in accordance with a read command, and perform processing of resetting an integration processing unit of an arithmetic processing unit to an initial state in accordance with a reset command.

According to this configuration, it is possible to instruct reading of the rotation number information, using the read command, and to instruct resetting of the integration processing unit of the arithmetic processing unit to an initial state, using the reset command.

In the aspect of the invention, the control unit may perform processing of resetting the integration processing unit of the arithmetic processing unit to an initial state, if the rotation number information is read in accordance with a read command.

According to this configuration, if the rotation number information is read by the read command, the integration processing unit of the arithmetic processing unit is reset to an initial state, and thus output or the like of displacement information of, for example, rotation number information can be performed.

In the aspect of the invention, if the number of bits of the decimal part of the rotation number information is set to n bits, a value which is obtained by multiplying an integer that is represented by the n bits and $360/2^n$ may be angle information which is obtained based on the angular velocity information.

According to this configuration, an external processing device or the like regards the decimal part of the rotation number information which is output from the output unit as an integer, and performs multiplication processing or the like of, for example, $360/2^n$. Accordingly, it is possible to obtain angle information corresponding to the rotation number information.

In the aspect of the invention, the output unit may output the rotation number information as serial data.

According to this configuration, an external processing device or the like receives the rotation number information as serial data, and thus it is possible to use the rotation number information as information for various applications.

In the aspect of the invention, the circuit device may further include an arithmetic processing unit which performs arithmetic processing based on the angular velocity information from the detection circuit and outputs the rotation number information.

According to this configuration, the arithmetic processing unit performs arithmetic processing based on the angular velocity information from the detection circuit, and thus it is possible to obtain the rotation number information and output the obtained rotation number information to the outside of the circuit device using the output unit.

In the aspect of the invention, the arithmetic processing unit may perform the arithmetic processing for the angular velocity information of floating point notation, and output the rotation number information of fixed-point notation.

According to this configuration, for example, even if angular velocity information of floating point notation is input from the detection circuit, the arithmetic processing unit can perform arithmetic processing for angular velocity information of the floating point notation, and can output rotation number information of the fixed-point notation.

In the aspect of the invention, the arithmetic processing unit may perform integration processing based on the angular velocity information as the arithmetic processing, and outputs the rotation number information.

According to this configuration, the arithmetic processing unit can obtain rotation number information by performing integration processing based on angular velocity information.

In the aspect of the invention, the circuit device may further include a drive circuit which drives the angular velocity sensor element, and the arithmetic processing unit may perform the arithmetic processing, based on the angular velocity information from the detection circuit and time interval information which is defined by a drive frequency of the drive circuit.

According to this configuration, it is possible to effectively use the drive frequency of the drive circuit, and to perform arithmetic processing based on angular velocity information, using time interval information which is defined by the drive frequency. Then, since the drive frequency is considered to have smaller variation due to process variation or environmental variation, it is possible to obtain more correct arithmetic results during arithmetic processing of obtaining rotation number information based on the angular velocity information.

In the aspect of the invention, the circuit device may further include a drive circuit which drives the angular velocity sensor element, and the arithmetic processing unit may perform the arithmetic processing, using an arithmetic coefficient in which a value based on a drive frequency of the drive circuit is set.

According to this configuration, even if there is variation or the like of the drive frequency, it is possible to reduce the effect thereof using, for example, arithmetic coefficients, and to obtain more correct arithmetic results.

In the aspect of the invention, the arithmetic processing unit may perform the arithmetic processing, using the arithmetic coefficient in which a value based on the drive frequency and setting sensitivity of the angular velocity information is set.

According to this configuration, it is possible to perform arithmetic processing using the arithmetic coefficients according to setting sensitivity of angular velocity information which is output from the detection circuit.

Another aspect of the invention relates to a physical quantity detection device including the circuit device described above; and the angular velocity sensor element.

Still another aspect of the invention relates to an electronic apparatus including the circuit device described above.

Yet another aspect of the invention relates to a moving object including the circuit device described above.

BRIEF DESCRIPTION OF THE DRAWINGS

The invention will be described with reference to the accompanying drawings, wherein like numbers reference like elements.

FIGS. 2A to 2B are explanatory diagrams of output formats of rotation number information.

FIGS. 3A and 3B are explanatory diagrams of a register of a register unit.

FIGS. 4A and 4B are explanatory diagrams of examples of a communication method of an output unit.

FIGS. 8A and 8B are examples of output results in a case in which the input signal of FIG. 7 is input.

FIGS. 10A and 10B are examples of output results in a case in which the input signal of FIG. 9 is input.

FIG. 12 is a detailed configuration example of an integration processing unit, a count clock generation circuit, or the like.

DESCRIPTION OF EXEMPLARY EMBODIMENTS

Hereinafter, a preferred embodiment of the invention will be described in detail. The present embodiment which will be described below is not intended to unduly limit the content of the invention described in the scope of the appended claims, and all of the configurations which are described in the present embodiment are not essential as solving means of the invention.

1. Circuit Device

Figure 1A:
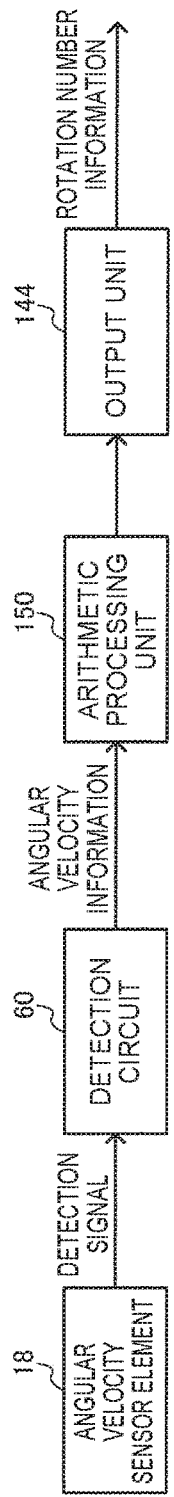
FIGS. 1A and 1B are configuration examples of a circuit device according to the present embodiment.

FIG. 1A illustrates a configuration example of a circuit device according to the present embodiment. A circuit device of FIG. 1A includes a detection circuit 60 and an output unit 144. In addition, the circuit device can include an arithmetic processing unit 150. The circuit device according to the present embodiment is not limited to the configuration of FIG. 1A, and can be implemented by various modifications such as, omitting a part of configuration elements thereof or adding other configuration elements.

The detection circuit 60 outputs angular velocity information, based on a detection signal from an angular velocity sensor element 18. The angular velocity sensor element 18 is a sensor element for detecting angular velocity. The angular velocity sensor element 18 can employ a vibrating reed 10 of a piezoelectric type such as a crystal vibrating reed, but the present embodiment is not limited to this. For example, the angular velocity sensor element 18 may be a sensor element of a capacitance detection type which is formed of a silicon substrate or the like.

The output unit 144 outputs rotation number information of fixed-point notation which is obtained based on angular velocity information. For example, the arithmetic processing unit 150 performs arithmetic processing based on angular velocity information from the detection circuit 60 and outputs the rotation number information. Specifically, the arithmetic processing unit 150 performs arithmetic processing for angular velocity information of floating point notation, and outputs rotation number information of fixed-point notation. For example, the arithmetic processing unit 150 performs integration processing based on angular velocity information as the arithmetic processing, and outputs rotation number information. Then, the output unit 144 outputs the rotation number information of fixed-point notation which is obtained by the arithmetic processing unit 150 to the outside of the circuit device. For example, the rotation number information is output to a processing device of a microcomputer or the like in the outside of the circuit device.

Then, the output unit 144 according to the present embodiment outputs an integer part of the rotation number information as an integer part of fixed-point notation. Meanwhile, the output unit 144 outputs a decimal part of the rotation number information as a decimal part of fixed-point notation. A detailed output method of the integer part and the decimal part of the rotation number information will be described below with reference to FIGS. 2A and 2B or the like.

Figure 1B:
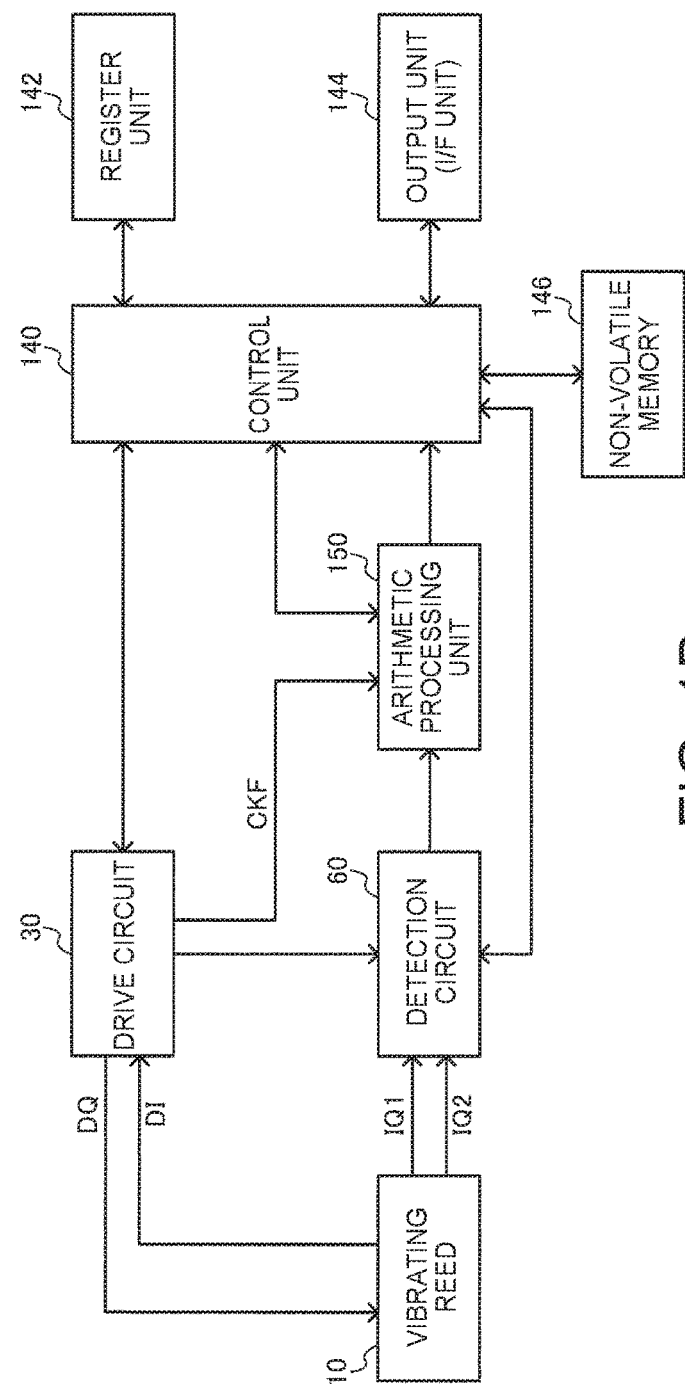

FIG. 1B illustrates a more detailed configuration example of the circuit device according to the present embodiment. The circuit device of FIG. 1B includes a drive circuit 30, the detection circuit 60, and the arithmetic processing unit 150. In addition, the circuit device can include a control unit 140, a register unit 142, the output unit 144, and a non-volatile memory 146. The circuit device according to the present embodiment is not limited to the configuration of FIG. 1B, and can be implemented by various modifications such as, omitting a part of configuration elements thereof (for example, nor-volatile memory, or the like) or adding other configuration elements (for example, temperature sensor, or the like).

The drive circuit 30 drives a vibrating reed 10. For example, the drive circuit 30 receives a feedback signal DI from the vibrating reed 10, outputs a drive signal DQ, and performs driving for vibrating the vibrating reed 10. By doing so, an oscillation loop is formed, and the vibrating reed 10 vibrates at a drive frequency of the drive signal DQ.

The detection circuit 60 outputs physical quantity information (for example, angular velocity information) corresponding to a physical quantity, based on detection signals IQ1 and IQ2 according to a physical quantity (for example, angular velocity) which is output from the vibrating reed 10. For example, the detection circuit 60 amplifies the detection signals IQ1 and IQ2 which are input, and performs synchronous detection for the amplified signal, using a synchronous signal from the drive circuit 30. Then, the detection circuit 60 performs A/D conversion of the signal which is obtained by performing the synchronous detection, and outputs physical quantity information. In this case, it is preferable that the detection circuit 60 performs signal processing such as filtering processing or correction processing for the information which is obtained by performing A/D conversion, and outputs physical quantity information in which signal processing is completed. The physical quantity information is, for example, digital data (for example, digital data of angular velocity) of a physical quantity.

The arithmetic processing unit 150 performs arithmetic processing based on physical quantity information (angular velocity information) from the detection circuit 60. For example, integration processing based on physical quantity information is performed as arithmetic processing. Alternatively, as will be illustrated below, posture arithmetic processing based on physical quantity information may be performed as arithmetic processing. Then, the arithmetic processing unit 150 outputs after-arithmetic physical quantity information (rotation number information) which is information that is obtained by performing arithmetic processing for physical quantity information. The arithmetic processing unit 150 can be realized by a logic circuit which is generated by an automatic arrangement and wiring method of, for example, a gate array or the like, or a processor or the like which operates based on firmware or the like. If an automatic arrangement and wiring method is used, for example, the arithmetic processing unit 150, the control unit 140, a DSP unit 110 of the detection circuit 60 which will be described below, and the like can be formed as one piece by the automatic arrangement and wiring method of a gate array, or the like.

The control unit 140 performs various control processing. For example, the control unit 140 performs control processing of the drive circuit 30, the detection circuit 60, and the arithmetic processing unit 150. In addition, the control unit 140 performs access control to the register unit 142, the control of the output unit 144, read control of the non-volatile memory 146, or the like. The control unit 140 can be realized by a processor or the like which operates based on a logic circuit which is generated by an automatic arrangement and wiring method of, for example, a gate array or the like, firmware, or the like.

The register unit 142 includes a register in which various types of information are set. The register unit 142 can be realized by a memory such as an SRAM, a flip-flop circuit, or the like.

The output unit 144 outputs various types of information. The output unit 144 functions as an interface unit (I/F unit) of an external device, and for example, outputs after-arithmetic physical quantity information from the arithmetic processing unit 150 by using a given communication method. For example, as will be described below, the output unit 144 outputs after-arithmetic physical quantity information such as rotation number information in a serial data (serial communication method).

The non-volatile memory 146 is a non-volatile memory which stores various types of information. For example, an EEPROM, an EPROM, or the like is used for the non-volatile memory 146. For example, a memory of a metal oxide nitride oxide silicon (MONOS) type can be used for the EEPROM. Alternatively, the EEPROM may be a memory of other types such as a floating gate type. In addition, the EEPROM may be a flash memory. Various things can be used for the non-volatile memory 146, and the non-volatile memory 146 may be a memory which uses, for example, a fuse, and a memory other than a semiconductor. In addition, the non-volatile memory 146 may be provided in an external device without being provided in the inside of a circuit device.

2. Output of Rotation Number Information

In general, in an apparatus in which a circuit device of a gyro sensor (physical quantity detection device) is embedded, the circuit device outputs angular velocity information, a processing device of an external microcomputer or the like performs integration processing of angular velocity, and thereby an angle is obtained. Meanwhile, it is also possible that integration processing of the angular velocity is performed by a circuit device, and the circuit device outputs a rotation angle of less than one rotation.

However, there is a case in which a rotation angle of less than one rotation is not required, and information on the number of rotations of a detection target is required, according to applications. Alternatively, there is an application in which information on the number of rotations is not important and only a rotation angle (decimal part of a number of rotations) is required, or an application in which both information on a number of rotations and a rotation angle are required. As an example, for camera handshake correction of a camera, information on a number of rotations is not required, but the final rotation angle of less than one rotation is required. Meanwhile, for motion analysis or the like which is performed after rotation or the like of an object is sensed, information on the number of rotations can be important.

In addition, in a case in which a processing device of an external microcomputer or the like receives output information of a circuit device, if the number of bits of the output information is great, load of reception processing of the processing device increases. For example, in a case in which the circuit device outputs the output information as serial data, if the number of bits of the output information is great, reception duration of the processing device is lengthened, thereby adversely affecting other processing of the processing device.

However, in a general circuit device, information which is output from the circuit device is only angle information, even if integration processing of angular velocity is performed in the circuit device. For this reason, the circuit device cannot be applied to various applications described above. In addition, there are problems that, if angle information with great number of bits is output all the time, load of the reception processing of the external processing device increases, reception duration is lengthened, thereby adversely affecting other processing.

Hence, in the present embodiment, a method is employed in which information obtained by performing integration processing of angular velocity is output as rotation number information. For example, rotation number information is divided into an integer part and a decimal part of the number of rotation for output.

Specifically, the detection circuit 60 outputs angular velocity information based on a detection signal from the vibrating reed 10 (angular velocity sensor element in a broad sense), and the output unit 144 outputs rotation number information of fixed-point notation obtained based on angular velocity information. For example, rotation number information of fixed-point notation is output in which m higher bits of rotation number information become an integer part and n lower bits become a decimal part.

Then, in the present embodiment, the output unit 144 can output an integer part of rotation number information as an integer part of fixed-point notation, and can output a decimal part of rotation number information as a decimal part of fixed-point notation. For example, an integer part of rotation number information is output as an integer part of fixed-point notation, and a decimal part of rotation number information is output as a decimal part of fixed-point notation. Specifically, an integer part of rotation number information is notated by m higher bits of fixed-point notation to be output, and a decimal part of rotation number information is notated by n lower bits of fixed-point notation to be output. The output unit 144 may output an integer part and a decimal part of rotation number information, and both the integer part and the decimal part are not required to be output all the time. For example, the output unit 144 can output rotation number information in various output modes, such as, outputting integer part of rotation number information and not outputting a decimal part of rotation number information, not outputting an integer part of rotation number information, and outputting a decimal part of rotation number information, and outputting both of an integer part and a decimal part of rotation number information.

An integer part of rotation number information is information indicating, for example, an integer of the number of rotations of a detection target. For example, an integer part of rotation number information is information in which integers of 1, 2, 3, 4, of 1 rotation, 2 rotation, 3 rotation, 4 rotation, . . . , are notated by m bits of fixed-point notation (binary notation).

Meanwhile, a decimal part of rotation number information is information in which the number of rotations (rotation angle) of a detection target which is less than one rotation is notated by a decimal point. For example, a decimal part of rotation number information is information in which decimal points of 0.1, 0.2, 0.3, 0.4, . . . of 0.1 rotation, 0.2 rotation, 0.3 rotation, 0.4 rotation, . . . are notated by n bits of fixed-point notation (binary notation). For example, if the number of rotations less than one rotation which is a decimal part of rotation number information is notated by rdm and each bit of n bits of a decimal part of fixed-point notation is notated by b1, b2, b3, b4, . . . (b1 is a higher bit and b4 is a lower bit), rdm can be notated by $rdm = b1/2 + b2/2^2 + b3/2^3 + b4/2^4, \ldots$.

FIG. 2A illustrates an example of output format of rotation number information which is output from the output unit 144. The rotation number information includes an integer part REVQ[15:0] of fixed-point notation of n=16 bits, and a decimal part DEGQ[23:0] of fixed-point notation of m=24 bits. That is, the rotation number information is notated by a fixed decimal point of 40 bits with a sign in which a decimal part becomes 24 bits. Then, an integer part REVQ represents the number of rotations of integers of 1, 2, 3, 4, . . . of 1 rotation, 2 rotation, 3 rotation, 4 rotation . . . . A decimal part DEGQ represents the number of rotations of decimal points of 0.1, 0.2, 0.3, 0.4, . . . of 0.1 rotation, 0.2 rotation, 0.3 rotation, 0.4 rotation . . . . For example, if a detection target of 3.5 rotation is detected, "3 rotation" of "3.5 rotation" is notated by the integer part REVQ, and "0.5 rotation" of "3.5 rotation" is notated by the decimal part DEGQ.

For example, it is assumed that 12 higher bits of the integer part REVQ of 16 bits are all zero. In this case, if 4 lower bits of the integer part REVQ of 16 bits are "0001", the number of rotation represented by the integer part REVQ is "1". If 4 lower bits are "0010", the number of rotation represented by the integer part REVQ is "2". If 4 lower bits are "0011", the number of rotation represented by the integer part REVQ is "3". By representing the integer part REVQ as an integer with a sign (2's complement representation), it is also possible to represent negative rotation number such as −2 rotation, and −3 rotation.

In addition, it is assumed that 20 lower bits of the decimal part DEGQ of 24 bits are all zero. In this case, if 4 higher bits of the decimal part DEGQ of 24 bits are "0001", the number of rotation represented by the decimal part DEGQ is $1/2^4 = 1/16$. If 4 higher bits are "0010", the number of rotation represented by the decimal part DEGQ is $1/2^3 = 1/8$. That is, detection targets of 1/16 rotation and 1/8 rotation are respectively detected. If 4 higher bits are "0100", the number of rotation represented by the decimal part DEGQ is $1/2^2 = 1/4$, and if 4 higher bits are "1000", the number of rotation represented by the decimal part DEGQ is $1/2$. That is, detection targets of 1/4 rotation and 1/2 rotation are respectively detected.

In addition, the decimal part DEGQ of rotation number information which is output from the output unit 144 is information which represents rotation angle of less than one rotation. Specifically, if the number of bits of the decimal part DEGQ of rotation number information is set to n bits, a value which is obtained by multiplying an integer notated by n bits and $360/2^n$ together becomes angle information obtained based on angular velocity information from the detection circuit 60. If the integer is considered to be an integer with a sign (2's complement representation) (external processing device interprets), the decimal part DEGQ represents an angle θ which changes in a range of −180 degrees≤θ<180 degrees, as illustrated in FIG. 2A. In addition, if the integer is considered to be an integer without a sign, the decimal part DEGQ represents an angle θ which changes in a range of 0 degrees≤θ<360 degrees.

For example, in order to simplify description, it is assumed that the number of bits of the decimal part DEGQ of rotation number information is n=4 bits.

In this case, if the decimal part DEGQ=0001, the number of rotations represented by DEGQ is $1/2^4 = 1/16$ rotation. Then, since an integer represented by the decimal part DEGQ is "1", the decimal part DEGQ of rotation number information becomes a value which is obtained by multiplying the integer "1" and $360/2^n$ together, and represents an angle of $1 \times 360/2^n = 1 \times 360/2^4 = (360/16)$ degrees. That is, since 1 rotation is 360 degrees, an angle corresponding to 1/16 rotation is represented.

In addition, if the decimal part DEGQ=0010, the number of rotations which is represented by DEGQ becomes $1/2^3 = 1/8$ rotation. Then, since an integer represented by the decimal part DEGQ is "2", the decimal part DEGQ of rotation number information becomes a value which is obtained by multiplying the integer "2" and $360/2^n$ together, and represents an angle of $2 \times 360/2^n = 2 \times 360/2^4 = (360/8)$ degrees. That is, an angle corresponding to 1/8 rotation is represented.

In the same manner, if the decimal part DEGQ=0100, the decimal part DEGQ represents $1/2^2 = 1/4$ rotation, an integer represented by the decimal part DEGQ is "4", and thus, the decimal part DEGQ represents an angle of $4 \times 360/2^n = 4 \times 360/2^4 = (360/4)$ degrees. In addition, if the decimal part DEGQ=1000, the decimal part DEGQ represents $1/2 = 1/2$ rotation, an integer represented by the decimal part DEGQ is "8", and thus, the decimal part DEGQ represents an angle of $8 \times 360/2^n = 8 \times 360/2^4 = (360/2)$ degrees.

In addition, if it is considered that the decimal part DEGQ is 1111 and this is an integer with a sign (2's complement representation), an integer represented by the decimal part DEGQ becomes "−1". Hence, the decimal part DEGQ of rotation number information becomes a value obtained by multiplying the integer "−1" and $360/2^n$ together, and represents an angle of $-1\times360/2^n=-1\times360/2^4=-(360/16)$ degrees. That is, an angle corresponding to $-\frac{1}{16}$ rotation is represented.

In addition, if it is considered that the decimal part DEGQ is 1110 and this is an integer with a sign, an integer represented by the decimal part DEGQ becomes "−2". Hence, the decimal part DEGQ of rotation number information becomes a value obtained by multiplying the integer "−2" and $360/2^n$ together, and represents an angle of $-2\times360/2^n=-2\times360/2^4=-(360/8)$ degrees. That is, an angle corresponding to $-\frac{1}{8}$ rotation is represented.

As can be apparent from the above description, an external processing device interprets a decimal part DEGQ of rotation number information which is output from a circuit device as an integer of n bits without a sign, performs processing of multiplying the integer and $360/2^n$ together, and thus it is possible to obtain information on an angle θ which is 0 degrees≤θ<360 degrees. In addition, an external processing device interprets a decimal part DEGQ of rotation number information which is output from a circuit device as an integer of n bits with a sign, performs processing of multiplying the integer and $360/2^n$ together, and thus it is possible to obtain information on an angle θ which is −180 degrees≤θ<180 degrees. As a result, it is possible to simplify processing of an external processing device, and to increase convenience.

In addition, in the present embodiment, the output unit 144 has multiple output modes. For example, rotation number information can be output in a different output mode by setting of a mode switching register of the register unit 142.

Then, the multiple output modes can include a first output mode in which the output unit 144 outputs an integer part REVQ of rotation number information and the output unit 144 outputs a decimal part DEGQ of rotation number information. That is, if the first output mode is set by the mode switching register, the output unit 144 outputs both the integer part REVQ and decimal part DEGQ of rotation number information.

In addition, the multiple output modes can include a second output mode in which the output unit 144 outputs an integer part REVQ of rotation number information and the output unit 144 does not output a decimal part DEGQ of rotation number information. That is, if the second output mode is set by the mode switching register, the output unit 144 outputs the integer part REVQ of rotation number information, but does not output a decimal part DEGQ.

In addition, the multiple output modes can include a third output mode in which the output unit 144 does not output an integer part REVQ of rotation number information and the output unit 144 outputs a decimal part DEGQ of rotation number information. That is, if the third output mode is set by the mode switching register, the output unit 144 outputs a decimal part DEGQ of rotation number information, but does not output an integer part REVQ.

In addition, the multiple output modes can include a fourth output mode in which the number of bits of decimal part DEGQ of rotation number information is reduced and is output by the output unit 144. For example, in the first output mode or the third output mode which are described above, a decimal part DEGQ of the number of bits of n bits is output by the output unit 144, but in the fourth output mode, the number of bits are subtracted from the n bits, and decimal part DEGQ of k bits (k<n) is output.

In the present embodiment, the multiple output modes may include at least two of the first, second, third, and fourth output modes. That is, the output modes of the output unit 144 do not need to include all the first, second, third, and fourth output modes. For example, as multiple output modes, only the first output mode and the second output mode may be provided, only the first output mode and third output mode may be provided, or only the second output mode and the third output mode may be provided. Alternatively, the fourth output mode, and any one of the first, second, and third output modes may be provided. In this way, various modifications can be implemented as the multiple output modes.

FIG. 2B illustrates an example of the mode switching register which switches the aforementioned multiple output modes. The mode switching register is provided in the register unit 142, is accessed by a processing device such as an external microcomputer, and can be set to desired content.

For example, if a mode switching register QCA[1:0] is set to (00), an output mode of the output unit 144 is set to the first output mode. As a result, the output unit 144 outputs both an integer part REVQ[15:0] of rotation number information and a decimal part DEGQ[23:0] of FIG. 2A.

Specifically, in the first output mode, the output unit 144 outputs rotation number information with 5 bytes, outputs an integer part REVQ[15:8] on a higher bit side at a first byte, and outputs an integer part REVQ[7:0] on a lower bit side at a second byte. In addition, the output unit 144 outputs a decimal part DEGQ[23:16] on a higher bit side at a third byte, outputs a decimal part DEGQ[15:8] between a higher bit side and a lower bit side at a fourth byte, and outputs a decimal part DEGQ[7:0] on a lower bit side at a fifth byte.

In addition, if the register QCA[1:0] is set to (11), the output mode of the output unit 144 is set to the second output mode. As a result, the output unit 144 outputs only an integer part REVQ[15:0] of rotation number information, and does not output a decimal part DEGQ[23:0].

Specifically, in the second output mode, the output unit 144 outputs rotation number information with 2 bytes, outputs an integer part REVQ[15:8] on a higher bit side at the first byte, and outputs an integer part REVQ[7:0] on a lower bit side at the second byte.

In addition, if the register QCA[1:0] is set to (10), the output mode of the output unit 144 is set to the third output mode. As a result, the output unit 144 outputs only a decimal part DEGQ[23:0] of rotation number information, and does not output an integer part REVQ[15:0].

Specifically, in the third output mode, the output unit 144 outputs rotation number information with 3 bytes, outputs a decimal part DEGQ[23:16] on a higher bit side at the first byte, outputs a decimal part DEGQ[15:8] between a higher bit side and a lower bit side at the second byte, and outputs a decimal part DEGQ[7:0] on a lower bit side at the third byte.

In addition, if the register QCA[1:0] is set to (01), the output mode of the output unit 144 is set to the fourth output mode. As a result, the number of bits of decimal part DEGQ of rotation number information is reduced and is output by the output unit 144.

Specifically, in the fourth output mode, the output unit 144 outputs rotation number information with 2 bytes, outputs a decimal part DEGQ[23:16] at the first byte, and outputs a decimal part DEGQ[15:8] at the second byte.

That is, in the third output mode, rotation number information with 3 bytes is output, and a decimal part DEGQ[7:0] on a lower bit side is also output. In contrast to this, in the fourth mode, the number of read bytes is reduced from 3 bytes to 2 bytes, and a decimal part DEGQ[7:0] on a lower bit side does not output.

According to the above description, an output mode is set to the first output mode (00) for a first application which requires both an integer part REVQ and a decimal part DEGQ of rotation number information, and thus it is possible to meet the requirements.

For example, in the first application, an external processing device determines the number of rotations (an integer of the number of rotations) of a detection target (vehicle body, camera, or the like), using an integer part REVQ of rotation number information. In addition, an external processing device determines a rotation angle of less than one rotation, using decimal part DEGQ. That is, as illustrated in FIG. 2A, by multiplying an integer represented by decimal part DEGQ[23:0] and $360 \times 2''=360 \times 2^{24}$ together, a rotation angle is obtained and determined. In the first output mode, the number of read bytes of rotation number information increases, but an external processing device can obtain detailed rotation number information including the number of rotations and a rotation angle of less than one rotation.

In addition, an output mode is set to the second output mode (11) for a second application in which an integer part REVQ of rotation number information is required but a decimal part DEGQ is not required, and thus it is possible to meet the requirements.

For example, in the second application, an external processing device determines only the number of rotations of a detection target, using an integer part REVQ of rotation number information. For example, in the second application in which only information on the numbers of rotations of a detection target is required and a rotation angle is not required, an output mode is set to the second output mode, and thus it is possible to reduce the number of read bytes of rotation number information. That is, it is possible to reduce the number of read bytes which is 5 bytes in the first output mode to 2 bytes in the second output mode. Hence, load of reception processing of rotation number information of the external processing device can be reduced, reception duration can also be reduced, and thus it is possible to reduce that reception processing of rotation number information adversely affects other processing.

In addition, an output mode is set to the third output mode (10) for a third application in which a decimal part DEGQ of rotation number information is required but an integer part REVQ is not required, and thus it is possible to meet the requirements.

For example, in the third application, an external processing device determines only a rotation angle, which is less than one rotation, of a detection target, using a decimal part DEGQ of rotation number information. For example, in the third application in which only information on the rotation angle, which is less than one rotation, of a detection target is required and information on the number of rotations is not required, an output mode is set to the third output mode, and thus it is possible to reduce the number of read bytes of rotation number information. That is, it is possible to reduce the number of read bytes which is 5 bytes in the first output mode to 3 bytes in the third output mode. Hence, it is possible to reduce load of reception processing of rotation number information of the external processing device, to reduce reception duration, and to reduce that reception processing adversely affects other processing.

In addition, an output mode is set to the fourth output mode (01) for a fourth application in which a decimal part DEGQ of rotation number information is required but accuracy of a decimal part DEGQ is not required by that amount, and thus it is possible to meet the requirements.

For example, in the fourth application, an external processing device determines a rotation angle of a detection target, using a decimal part DEGQ of rotation number information in which the number of bits is reduced, compared to the first output mode and the third output mode. For example, in the first and third applications, the number of bits of decimal part DEGQ is 24 bits, but in the fourth output mode, the number of bits of decimal part DEGQ is reduced from 24 bits to 16 bits. That is, the bits on a lower bit side are reduced. In the fourth application in which accuracy of a rotation angle is not required by that amount, it is possible to meet the requirements, even if the number of bits of decimal part DEGQ is reduced. Hence, by setting an output mode to the fourth output mode, it is possible to reduce the number of bytes of decimal part DEGQ which is 3 bytes in the first and third output modes, to 2 bytes. Hence, it is possible to reduce load of reception processing of rotation number information of the external processing device, to reduce reception duration, and to reduce that reception processing adversely affects other processing.

In this way, according to a method of outputting rotation number information of the present embodiment, information obtained by integration processing of angular velocity is output as rotation number information, rotation number information is divided into an integer part REVQ and a decimal part DEGQ to be output, and thus it is possible to output information in an optimal output form corresponding to each application of an external processing device.

FIGS. 3A and 3B illustrate examples of a register included in the register unit 142. In the present embodiment, the register unit 142 includes an information register which stores rotation number information (after-arithmetic physical quantity information in a broad sense, and hereinafter, the same). Then, the control unit 140 performs processing of reading rotation number information (after-arithmetic physical quantity information) from the information register in accordance with a read command. In addition, processing of resetting an integration processing unit 156 (referring to FIG. 11A) of the arithmetic processing unit 150 to an initial state is performed in accordance with a reset command. For example, an integrator of the integration processing unit 156 is reset, and an integration value (for example, angle displacement) retained in the integrator is reset to an initial value (for example, 0).

If rotation number information (after-arithmetic physical quantity information) is read by a read command, processing of resetting the integration processing unit 156 (integrator) of the arithmetic processing unit 150 to an initial state may be performed. For example, after rotation number information is read, the integrator of the integration processing unit 156 is reset, and an integration value retained in the integrator is reset.

For example, in FIG. 3A, a register MCTL with an address ADX is a setting register of the arithmetic processing unit 150. A register RDAG with an address ADY is an information register in which rotation number information (after-arithmetic physical quantity information) is stored. A register AGRS with an address ADZ is a register which instructs resetting of the integration processing unit 156.

If rotation number information obtained by arithmetic processing by the arithmetic processing unit 150 is read, an external processing device designates the address ADY of FIG. 3A and instructs reading of rotation number information of the register RDAG. As a result, the output unit 144 outputs the rotation number information illustrated in FIG. 3A as serial data as illustrated in FIGS. 4A and 4B which will be described below. Specifically, an external processing device designates the address ADY of FIG. 3A in accordance with A0 to A6 of FIGS. 4A and 4B, and thus a read command is issued. Then, the control unit 140 reads rotation number information from the register RDAG with the address ADY. As a result, an external processing device can read rotation number information obtained by performing integration processing of angular velocity information detected by the vibrating reed 10, from a circuit device.

In addition, if the integration processing unit 156 of the arithmetic processing unit 150 is reset to an initial state, an external processing device designates the address ADZ of FIG. 3A, thereby instructing resetting of the integration processing unit 156. Specifically, an external processing device designates the address ADZ of FIG. 3A in accordance with A0 to A6 of FIGS. 4A and 4B, and thus a reset command is issued. Then, the control unit 140 resets the integration processing unit 156 to an initial state, using, for example, a reset signal. By doing so, an external processing device issues a reset command and resets the integration processing unit 156, for example, in a reference posture state in which a detection target is stopped. After that, if the detection target rotates in a given angular velocity, it is possible to obtain rotation number information (rotation angle information) or the like of the detection target from the reference posture state.

In this case, whenever information is read from the register RDAG of FIG. 3A, the integration processing unit 156 may be reset to an initial state. For example, in posture information such as quaternion which will be described below, only angle displacement (slight change amount of angle) can be required. In this case, if the integration processing unit 156 is reset whenever rotation number information which is angle information is read, angle displacement (Δθ) is output from the output unit 144. As a result, an external processing device can perform posture arithmetic processing which uses posture information such as quaternion, using the angle displacement, and thus it is possible to increase convenience.

FIG. 3B is a diagram illustrating details of the setting register MCTL of the arithmetic processing unit 150 of the address ADX of FIG. 3A.

For example, a register QCA[1:0] of bits of 2 and 1 of the address ADX illustrated in FIG. 3B is a mode switching register of an output mode of rotation number information illustrated in FIG. 2B. The first, second, third, and fourth output modes illustrated in FIG. 2B can be set by setting of the register QCA[1:0].

In addition, a register ENBAG of a bit of 0 of the address ADX is a setting register of operation enablement of the arithmetic processing unit 150. If the register ENBAG is set to "1", an operation of the arithmetic processing unit 150 is enabled, and if the register ENBAG is set to "0", the operation of the arithmetic processing unit 150 is disenabled.

FIGS. 4A and 4B are explanatory diagrams illustrating an example of a communication method of the output unit 144. In FIGS. 4A and 4B, the output unit 144 outputs information in a serial communication method, and SPI (four line SPI or the like) is used as the serial communication method. The communication method is not limited to this, and can employ various communication methods such as I2C.

In FIGS. 4A and 4B, XSS is slave select, SCLK is clock for serial communication, MOSI is serial data input, and MISO is serial data output. "R" of MOSI represents a read command, A0 to A6 represents address designation of a register. For example, if rotation number information (angle information) is read from a circuit device, the address ADY of FIG. 3A is designated by A0 to A6. FIG. 4A is an example of data reading of 16 bits, and FIG. 4B is an example of data reading of 24 bits.

For example, an integer part REVQ [15:0] in the first output mode or the second output mode, or a decimal part DEGQ[23:8] in the fourth output mode of FIG. 2B are read by the data reading of 16 bits, as illustrated in FIG. 4A.

Meanwhile, a decimal part DEGQ[23:0] in the first output mode or the third output mode is read by the data reading of 24 bits, as illustrated in FIG. 4B.

For example, in the first output mode of FIG. 2B, reading of an integer part REVQ[15:0] according to FIG. 4A, and reading of a decimal part DEGQ[23:0] according to FIG. 4B are required. In contrast to this, in the second output mode, only reading of an integer part REVQ[15:0] according to FIG. 4A is required, and in the third output mode, only reading of a decimal part DEGQ[23:0] according to FIG. 4B is required. Hence, in the second and third output modes, it is possible to reduce load of read processing of an external processing device, and to reduce a read duration, or the like, compared to the first output mode.

In addition, in the fourth output mode, only reading of a decimal part DEGQ[23:8] according to FIG. 4A is required. Hence, in the fourth output modes, it is possible to reduce load of read processing of an external processing device, and to reduce a read duration, or the like, for example, compared to the third output mode or the like.

3. Arithmetic Processing which Uses Time Interval Information

In the present embodiment, the arithmetic processing unit 150 performs arithmetic processing based on physical quantity information and time interval information which is defined by a drive frequency of the drive circuit 30, and outputs after-arithmetic physical quantity information. For example, the arithmetic processing unit 150 performs arithmetic processing based on physical quantity information and time interval information which is defined by a reference clock signal CKF that is generated based on a signal of the drive circuit 30. The reference clock signal CKF is, for example, a signal which sets a drive frequency of the drive circuit 30 to a clock frequency. Then, if physical quantity information from the detection circuit 60 is angular velocity information, the arithmetic processing unit 150 outputs angle information as after-arithmetic physical quantity information. In the present embodiment, rotation number information is output as the angle information. The after-arithmetic physical quantity information (rotation number information, angle information) is output to the outside of a circuit device by the output unit 144 (I/F unit).

The arithmetic processing unit 150 performs integration processing based on physical quantity information as an arithmetic processing. Alternatively, the arithmetic processing unit 150 may perform posture arithmetic processing based on physical quantity information as arithmetic processing. Posture arithmetic processing is arithmetic processing which uses posture information such as quaternion.

The arithmetic processing unit 150 performs arithmetic processing for physical quantity information of floating point notation as will be describe below, and outputs after-arithmetic physical quantity information of fixed-point notation. For example, physical quantity information of floating point notation from the detection circuit 60 (DSP unit) is input to the arithmetic processing unit 150. The arithmetic processing unit 150 performs arithmetic processing for the physical quantity information of floating point notation, and outputs after-arithmetic physical quantity information of fixed-point notation. For example, the arithmetic processing unit 150 outputs rotation number information in which an integer part of rotation number information is denoted by an integer part of fixed-point notation, and a decimal part of rotation number information is denoted by a decimal part of fixed-point notation. The rotation number information of fixed-point notation is output to the outside by the output unit 144.

In addition, the arithmetic processing unit 150 performs arithmetic processing, using arithmetic coefficient in which a value based on a drive frequency of the drive circuit 30 is set. For example, the arithmetic processing unit 150 performs arithmetic processing of integration processing or the like, using arithmetic coefficient CF which will be described below. In this case, it is preferable that the arithmetic processing unit 150 performs arithmetic processing, using arithmetic coefficient in which a value based on setting sensitivity of a drive frequency and physical quantity information is set. Specifically, the arithmetic processing unit 150 performs arithmetic processing, based on time interval information which is defined by measurement results of a drive frequency. For example, the arithmetic processing unit 150 measures a drive frequency at the time of manufacturing or the like, and performs arithmetic processing, based on time interval information which is defined by the measurement results. For example, the arithmetic processing unit 150 sets the arithmetic coefficient and sets time interval information based on the arithmetic coefficient by measurement results of a drive frequency, and performs arithmetic processing. In this case, it is preferable that drive frequency information which is set based on measurement results of a drive frequency is written to the non-volatile memory 146. Then, the arithmetic processing unit 150 performs arithmetic processing, based on time interval information which is defined by the drive frequency information from the non-volatile memory 146. The drive frequency information is information whose value is set by a value of a drive frequency, and for example, the arithmetic coefficient CF which will be described below corresponds to the drive frequency information.

Figure 5A:
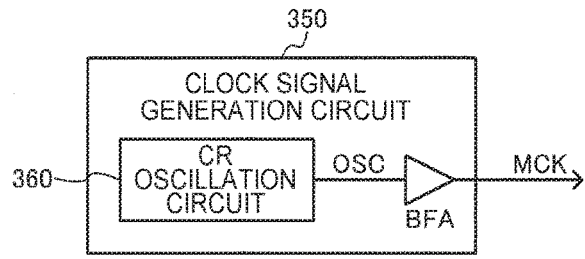
FIGS. 5A to 5E are explanatory diagrams of arithmetic processing based on time interval information which is defined by a reference clock signal.

For example, in FIG. 5A, a clock signal generation circuit 350 includes a CR oscillation circuit 360, an oscillation signal OSC generated by the CR oscillation circuit 360 is buffered by a buffer circuit BFA, and a clock signal MCK is output. The clock signal MCK is a signal which becomes a master clock. That is, the detection circuit 60 (for example, an A/D conversion circuit or a DSP unit), the control unit 140, the arithmetic processing unit 150, or the like operates by using the clock signal MCK as a master clock.

In the CR oscillation circuit 360, the oscillation frequency is greatly changed by process variation or environmental variation. For example, an oscillation frequency of the CR oscillation circuit 360 is determined by a time constant CR based on a capacitance value of a capacitor and a resistance value of a resistor element which are included in the CR oscillation circuit 360, but the capacitance value and the resistance value have fluctuation due to variation of manufacturing process. In addition, if temperature varies, a resistance value of a resistor element, ON resistances of transistors which configure the CR oscillation circuit 360, or the like vary, and an oscillation frequency varies. Further, if power supply voltage varies, an oscillation frequency varies. For this reason, as illustrated in FIG. 5A, if the clock signal MCK is generated by using the clock signal generation circuit 350 having a simple configuration which uses only the CR oscillation circuit 360, a clock frequency of the clock signal MCK also is varied by process variation or environmental variation.

For example, the detection circuit 60 operates by using the clock signal MCK as a master clock. Specifically, the clock signal MCK is generated by a circuit which uses the CR oscillation circuit 360, and operates the detection circuit 60, the arithmetic processing unit 150, and the like. Then, if the CR oscillation circuit 360 oscillates in accordance with a frequency higher than a drive frequency (for example, 50 KHz to 200 KHz) of the drive circuit 30, the detection circuit 60 (for example, an A/D conversion circuit, a DSP unit), the control unit 140, or the like can operate in accordance with the clock signal MCK of a high clock frequency (for example, 500 KHz to several MHz). As a result, for example, A/D conversion processing or digital signal processing (digital filtering processing, correction processing) of the detection circuit 60 can be quickly performed, such processing is quickly terminated, and it is possible to realize processing which could not be realized in a case in which a clock signal with a frequency of a drive signal is used.

However, if the detection circuit 60 operates in accordance with the clock signal MCK, an output period (data rate) of the physical quantity information from the detection circuit 60 is also varied by process variation, or environmental variation. For example, the detection circuit 60 outputs physical quantity information, based on a division clock signal which is obtained by dividing (for example, divided into 32 to 128) the clock signal MCK. That is, physical quantity information is output by the output period (data rate) of the division clock signal.

Figure 5B:
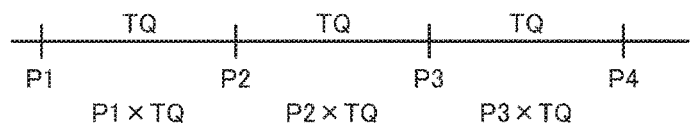

For example, in FIG. 5B, physical quantity information P1, P2, P3, . . . are output from the detection circuit 60 (for example, a DSP unit) during an output period duration TQ. If integration processing of the physical quantity information is performed, processing in which, for example, P1×TQ, P2×TQ, P3×TQ, . . . are obtained for multiplication may be performed.

Figure 5C:
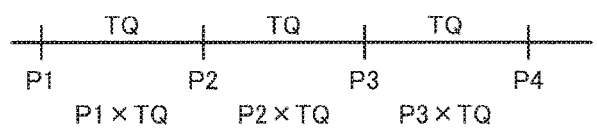
Figure 5D:
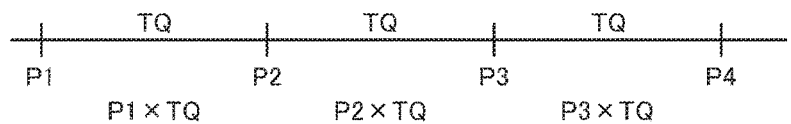

However, if the frequency of the clock signal MCK is varied by process variation or environmental variation (temperature variation, power supply voltage variation or the like), the output period duration TQ also varies as illustrated in FIGS. 5C and 5D. That is, the above-described division clock signal which defines the output period duration TQ is a signal which is obtained by dividing the clock signal MCK, and thus, if the frequency of the clock signal MCK is varied by process variation or environmental variation, the frequency of the division clock signal also varies, and a length of the output period duration TQ corresponding to a reversed frequency of the division clock signal also varies.

For example, in FIG. 5C, if the output period duration TQ is shortened, integration processing results obtained by P1×TQ, P2×TQ, P3×TQ, . . . become small. If a case in which physical quantity information is angular velocity is used as an example, an angle which is integration processing results becomes small.

In addition, in FIG. 5D, if the output period duration TQ is lengthened, integration processing results obtained by P1×TQ, P2×TQ, P3×TQ, . . . become great. If a case in which physical quantity information is angular velocity is used as an example, an angle which is integration processing results becomes great. Hence, there is a problem that correct arithmetic results cannot be obtained.

Figure 5E:
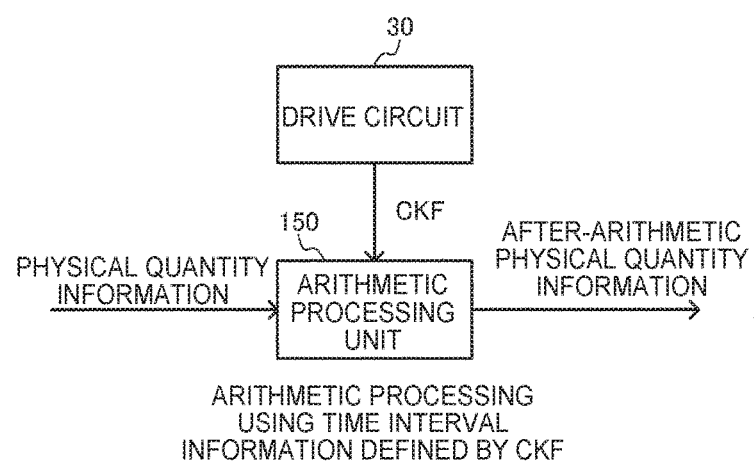

Regarding this point, in the present embodiment, as illustrated in FIG. 5E, arithmetic processing of physical quantity information is performed by using time interval information which is defined by a drive frequency of the drive circuit 30. For example, arithmetic processing of physical quantity information is performed by setting time interval information as time term (t). Specifically, the arithmetic processing unit 150 performs arithmetic processing of, for example, integration processing or the like, based on physical quantity information from the detection circuit 60, and time interval information which is defined by the reference clock signal CKF generated based on a signal of the drive circuit 30. Alternatively, the arithmetic processing unit 150 performs arithmetic processing of posture arithmetic processing or the like, as will be described below. Then, the arithmetic processing unit 150 outputs information obtained by arithmetic processing as after-arithmetic physical quantity information. For example, if physical quantity information is angular velocity information, the arithmetic processing unit 150 outputs angle information (rotation number information) as after-arithmetic physical quantity information.

By doing so, the arithmetic processing unit 150 can output after-arithmetic physical quantity information (more correct after-arithmetic physical quantity information) in which more correct arithmetic processing is performed. For example, if physical quantity information is angular velocity information, the arithmetic processing unit 150 can output angle information (rotation number information) in which more correct integration processing is performed.

That is, the reference clock signal CKF is a signal generated based on the signal of the drive circuit 30, and frequency variation, which is caused by process variation or environmental variation, of the drive frequency of the drive circuit 30 is significantly reduced in proportion to an oscillation frequency of the CR oscillation circuit 360. Hence, variation, which is caused by process variation or environmental variation, of time interval information defined by the reference clock signal CKF is also significantly reduced, compared to a case in which time interval information is defined by a CR oscillation frequency. Hence, if the arithmetic processing unit 150 performs arithmetic processing of integration processing, posture arithmetic processing, or the like for physical quantity information, using the time interval information with significantly small variation caused by process variation or environmental variation, it is possible to obtain correct arithmetic results. That is, the arithmetic processing unit 150 can output after-arithmetic physical quantity information with small variation caused by process variation or environmental variation. For example, if physical quantity information is angular velocity information, the arithmetic processing unit 150 can output correct angle information (rotation number information).

Here, if the reference clock signal CKF is generated based on a signal of the drive circuit 30, the signal of the drive circuit 30 is an output signal or the like of an amplification circuit (for example, an amplification circuit 32 which will be described below) included in the drive circuit 30. The output signal is, for example, a sinusoidal signal whose frequency becomes a drive frequency, and for example, the reference clock signal CKF can be generated by using a comparator which compares the sinusoidal signal with a reference voltage, a buffer circuit, or the like. For example, a signal which is obtained by buffering an output signal of the comparator using a first buffer circuit becomes a synchronization signal (SYC) which is input to the detection circuit 60, and a signal which is obtained by buffering the output signal of the comparator using a second buffer circuit becomes the reference clock signal CKF.

By doing so, time interval information is defined by the reference clock signal CKF which uses the drive frequency (for example, 50 KHz to 200 KHz) of the drive circuit 30 as a clock frequency, and arithmetic processing (integration processing and posture arithmetic processing) of the arithmetic processing unit 150 can be performed based on time interval information. A method of generating the reference clock signal CKF can be implemented by various modifications. For example, the reference clock signal CKF may be generated by using the signal of the drive circuit 30 in various types, and may be a signal which is synchronous to a frequency, for example, a drive frequency.

In the above description, situations in a case in which the output period duration TQ of physical quantity information varies due to variation of the oscillation frequency of the CR oscillation circuit 360 is used as an example, but application examples according to the present embodiment are not limited to the situation. That is, even in situations in which the output period duration TQ varies due to factors other than the variation of such an oscillation frequency, the method according to the present embodiment is applied, and thus it is possible to obtain correct arithmetic results in various arithmetic processing such as, integration processing, posture arithmetic processing, and the like.

That is, in the present embodiment, arithmetic processing is performed based on physical quantity information and time interval information defined by measurement results of the drive frequency. For example, at the time of manufacture or the like, a drive frequency is actually measured, and arithmetic processing of integration processing, posture arithmetic processing, or the like is performed by using time interval information defined by the measurement results. Specifically, drive frequency information which is set based on the measurement results of the drive frequency is written to the non-volatile memory 146. It is preferable that the non-volatile memory 146 is provided in the inside of a circuit device, but the non-volatile memory 146 may be provided in the outside of a circuit device. Thus, the arithmetic processing unit 150 performs arithmetic processing of integration processing, posture arithmetic processing, or the like, based on time interval information defined by drive frequency information (for example, arithmetic coefficient CF which will be described below) from the non-volatile memory 146.

In this way, arithmetic processing is performed by using drive frequency information which is read from the non-volatile memory 146, and thus it is possible to obtain correct arithmetic results in various arithmetic processing of integration processing, posture arithmetic processing, or the like. Specifically, in the present embodiment, the drive frequency of the drive circuit 30 is measured, and drive frequency information defined by the drive frequency is written to the non-volatile memory 146. For example, in a state in which the vibrating reed 10 (angular velocity sensor element) is coupled to the circuit device according to the present embodiment, a drive frequency of the drive signal of the drive circuit 30 is measured, and drive frequency information obtained based on the measurement results is written to the non-volatile memory 146. For example, a physical quantity detection device according to the present embodiment is configured by the vibrating reed (physical quantity transducer) 10, and a circuit device (Semiconductor chip) which is coupled to the vibrating reed 10 and is embedded in a package together with the vibrating reed 10, but the drive frequency is measured in a state in which the vibrating reed 10 and the circuit device are electrically coupled to each other in such a way. The drive frequency fluctuates in each product of the physical quantity detection device due to physical properties or the like of a shape or the like of the vibrating reed 10, even though the products have the same model number. For example, the drive frequency has fluctuation of approximately several KHz.

Regarding this point, in the present embodiment, a drive frequency with the fluctuation is measured, correct drive frequency information obtained by measurement is written to the non-volatile memory 146, and is used for arithmetic processing of the arithmetic processing unit 150. Hence, time interval information is defined and arithmetic processing can be performed, based on correct drive frequency information which is not affected by the fluctuation, and thus it is possible to obtain correct arithmetic results.

Drive frequency information may be the drive frequency itself of the drive circuit 30, and may be a parameter in which a value is set based on the drive frequency. The arithmetic coefficient (CF) which will be described below will be assumed as the parameter. However, the drive frequency information according to the present embodiment is not limited to a parameter of the arithmetic coefficient.

Next, a specific example of time interval information defined by the reference clock signal CKF will be described. In the present embodiment, arithmetic processing is performed by using the number of edges of the reference clock signal CKF during an output period duration of physical quantity information as time interval information. Here, the number of edges is, for example, the number of rising edges of the reference clock signal CKF. The number of edges may be, for example, the number of falling edges of the reference clock signal CKF, and may be the number of edges in which the number of rising edges is added to the number of falling edges.

Figure 6A:
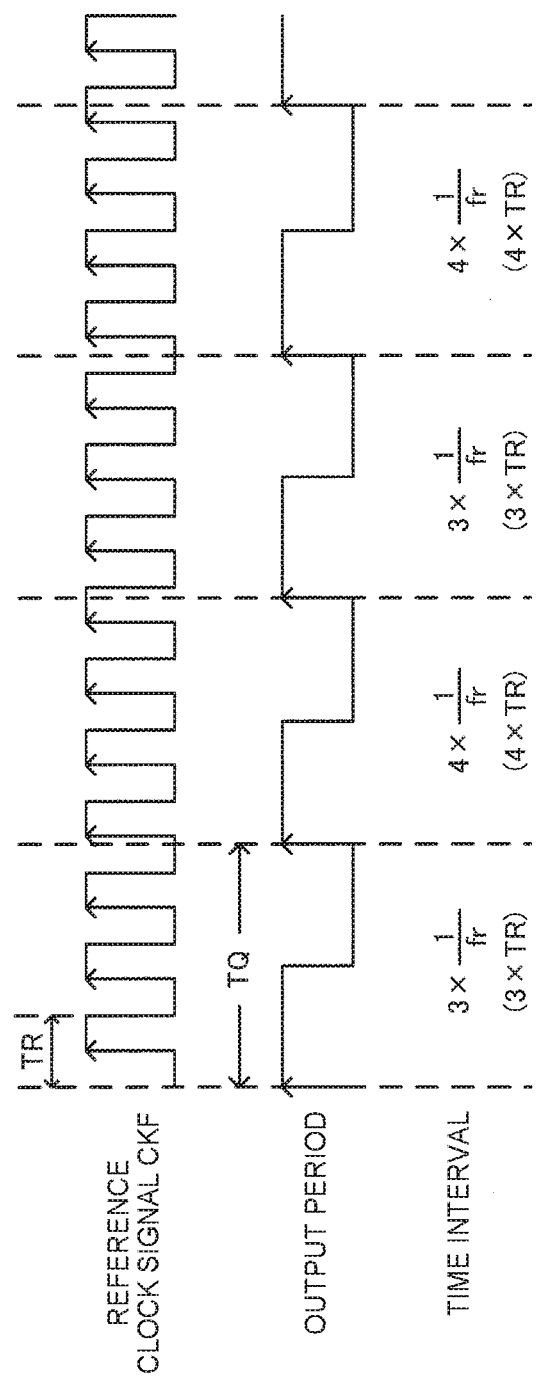
FIGS. 6A and 6B are explanatory diagrams of specific examples of arithmetic processing based on time interval information.

For example, in FIG. 6A, for example, the number of rising edges of the reference clock signal CKF is counted during the output period duration TQ, and the count value is used as time interval information. That is, instead of time interval, the number of edges of the reference clock signal CKF is used.

Specifically, in FIG. 6A, physical quantity information from the detection circuit 60 is input to the arithmetic processing unit 150 in each output period duration TQ. Meanwhile, a period of the reference clock signal CKF is referred to as TR, and the reference clock signal CKF is asynchronous to an output period of physical quantity information from the detection circuit 60.

Then, in a first output period duration of FIG. 6A, the number of rising edges of the reference clock signal CKF during the output period duration is three. Hence, in this case, time interval of the output period duration is regarded as 3×(1/fr)=3×TR. Here, fr is a frequency of the reference clock signal CKF, TR is a period, and a relationship of 1/fr=TR is obtained.

In addition, in a second output period duration, the number of rising edges of the reference clock signal CKF during the output period duration is four. Hence, time interval of the output period duration is regarded as 4×(1/fr)=4×TR.

In addition, in a third output period duration, the number of rising edges of the reference clock signal CKF during the output period duration is three. Hence, time interval of the output period duration is regarded as 3×(1/fr)=3×TR.

In addition, in a fourth output period duration, the number of rising edges of the reference clock signal CKF during the output period duration is four. Hence, time interval of the output period duration is regarded as 4×(1/fr)=4×TR.

For example, time intervals (lengths) of the first, second, third, and fourth output period durations of FIG. 6A are lengths correctly between 3×TR and 4×TR, and is, for example, approximately 3.4×TR, but in the present embodiment, the time intervals are regarded as 3×TR, 4×TR, 3×TR, and 4×TR.

By regarding time interval as an integer multiple of TR in this way, a count value of a counter which will be described below can be used instead of the time interval information. As a result, it is possible to realize simplification and miniaturization of a circuit. Meanwhile, even if time intervals of the first, second, third, and fourth output period durations are respectively regarded as 3×TR, 4×TR, 3×TR, and 4×TR, an average time interval is (3×TR+4×TR+3×TR+4×TR)/4=3.5×TR, and approaches an actual time interval (approximately 3.4×TR). Hence, even if arithmetic processing is performed in which time intervals are regarded as an integer multiple of TR in that way, arithmetic processing results viewed from a long duration become correct arithmetic results.

In addition, in the present embodiment, the time interval of the output period duration TQ is measured by using the reference clock signal CKF in which frequency variation due to process variation or environmental variation is very small. Hence, as illustrated in FIGS. 5C and 5D, even if the time interval of the output period duration TQ varies due to process variation or environmental variation, it is possible to measure a correct time interval using the reference clock signal CKF. Hence, by performing arithmetic processing based on the time interval information, it is possible to obtain correct arithmetic results. That is, even if there is process variation or environmental variation, it is possible to obtain arithmetic results in which variation due to process variation or environmental variation decreases to a minimum value.

Figure 7:
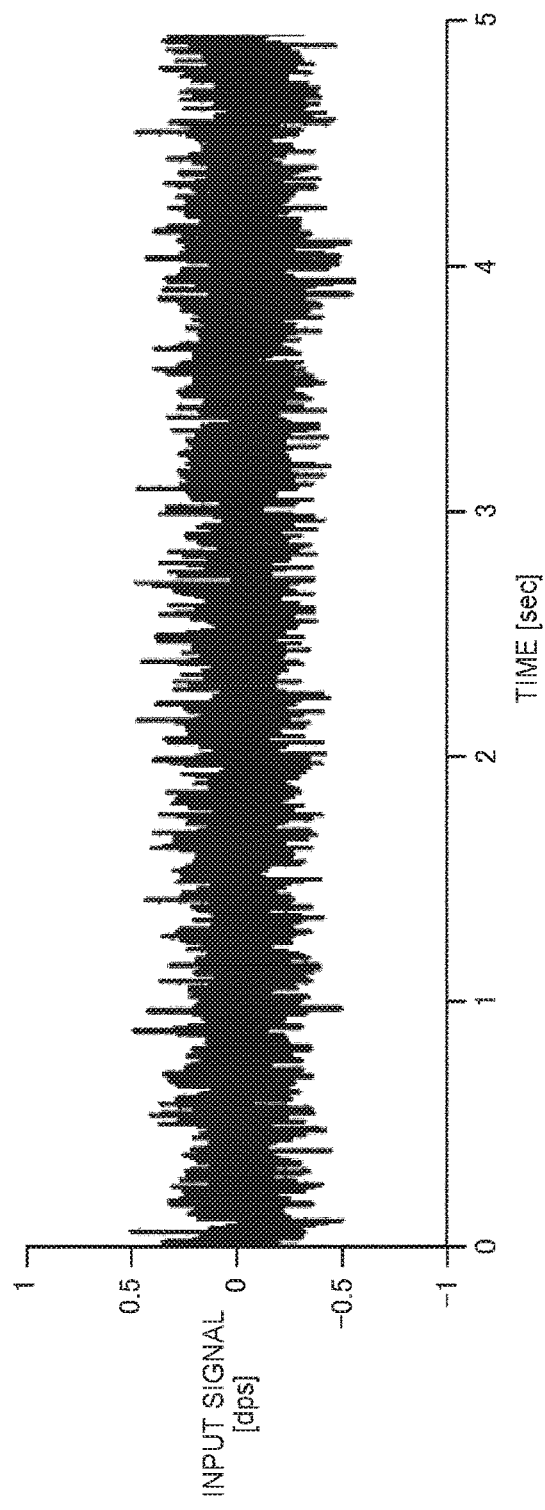
FIG. 7 is an example of an input signal to an arithmetic processing unit.

For example, angular velocity signal illustrated in FIG. 7 is input to the arithmetic processing unit 150 as an input signal. Angular velocity of the angular velocity signal of FIG. 7 is zero, but fluctuation occurs due to noise.

Figure 6B:
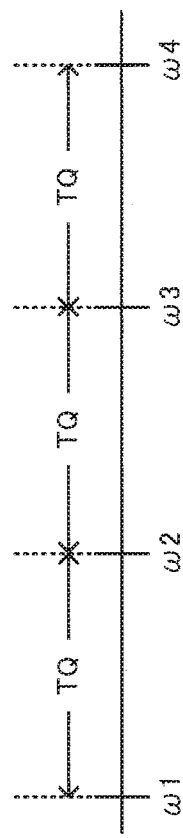

FIG. 8A illustrates an example of arithmetic results of the arithmetic processing unit 150 in a case in which the angular velocity signal is input. That is, FIG. 8A illustrates arithmetic results (angle) in a case in which a method according to the present embodiment is used. Meanwhile, FIG. 8B illustrates an example of theoretical value of arithmetic results. The theoretical value is an ideal value of integration processing of performing multiplication processing of W1×TQ, W2×TQ, W3×TQ, . . . , as illustrated in FIG. 6B.

As illustrated in FIGS. 8A and 8B, according to the method of the present embodiment, it is possible to obtain arithmetic results which extremely approach a theoretical value. That is, as illustrated in FIG. 6A, even if arithmetic processing is performed in which a time interval is regarded as an integer multiple of TR, arithmetic results which extremely approach an ideal value can be output as a result.

Figure 9:
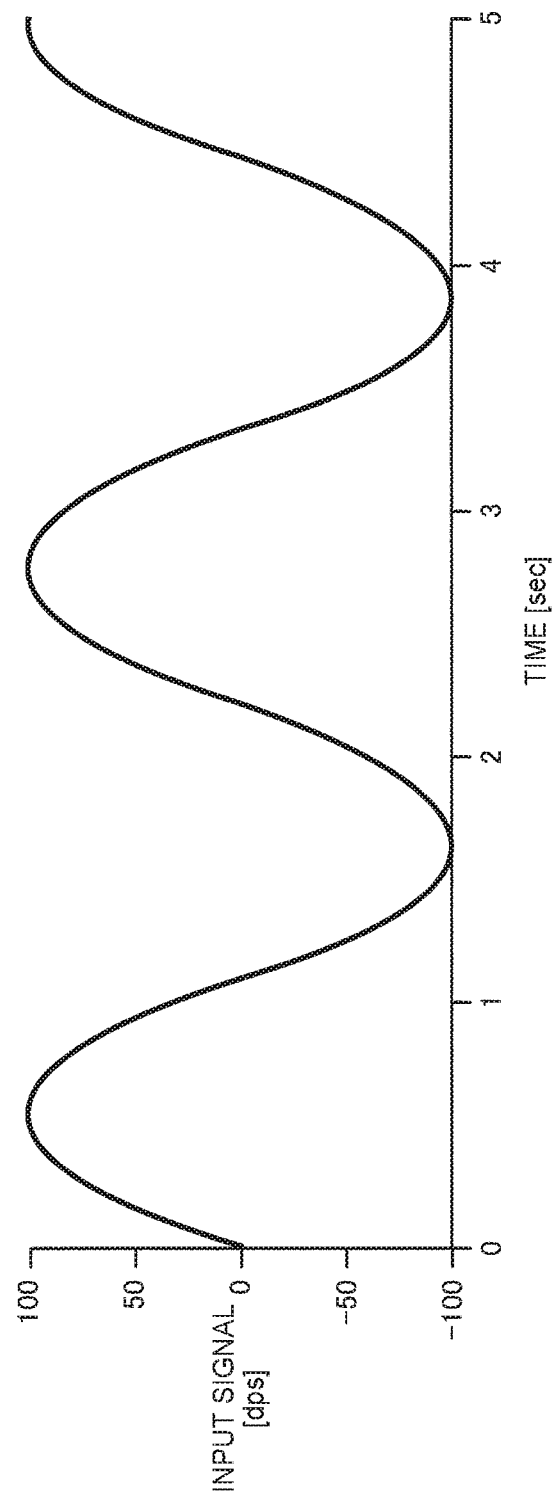
FIG. 9 is an example of the input signal to the arithmetic processing unit.

In addition, for example, an angular velocity signal illustrated in FIG. 9 is input to the arithmetic processing unit 150 as an input signal. The angular velocity signal of FIG. 9 is a sinusoidal signal.

FIG. 10A illustrates an example of arithmetic results of the arithmetic processing unit 150 in a case in which the angular velocity signal is input, and FIG. 10B illustrates an example of a theoretical value. As illustrated in FIGS. 10A and 10B, according to a method of the present embodiment, it is possible to obtain arithmetic results which extremely approach a theoretical value.

4. Configuration of Arithmetic Processing Unit

Figure 11A:
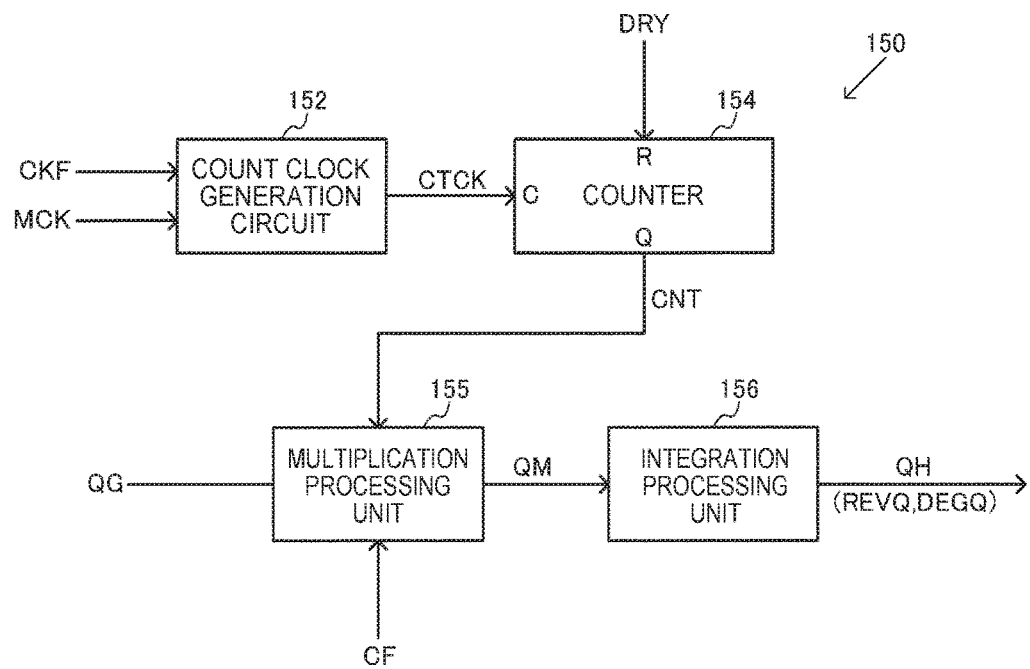
FIGS. 11A and 11B are respectively a detailed configuration example of the circuit device according to the present embodiment and an operation explanatory diagram thereof.

FIG. 11A illustrates a configuration example of the arithmetic processing unit 150. The arithmetic processing unit 150 according to the present embodiment is not limited to a configuration of FIG. 11A, and can be implemented by various modifications such as, omitting a part of configuration elements thereof or adding other configuration elements.

The arithmetic processing unit 150 of FIG. 11A includes a counter 154 and a multiplication processing unit 155. Then, the counter 154 is reset by a signal DRY synchronous to an output period of angular velocity information QG (physical quantity information in a broad sense, and hereinafter, the same) from the detection circuit 60. Then, a count operation is performed by a signal CTCK based on a reference clock signal CKF.

The multiplication processing unit 155 performs multiplication processing based on the angular velocity information QG (physical quantity information) from the detection circuit 60, and a count value CNT from the counter 154. More specifically, the multiplication processing unit 155 receives an arithmetic coefficient CF (drive frequency information in a broad sense) whose value is set based on a drive frequency of the drive circuit 30, and performs multiplication processing based on the angular velocity information QG (physical quantity information) from the detection circuit 60, the count value CNT from the counter 154, and the arithmetic coefficient CF.

In addition, the arithmetic processing unit 150 of FIG. 11A includes a count clock generation circuit 152 and the integration processing unit 156. The count clock generation circuit 152 receives the reference clock signal CKF and a clock signal MCK, and outputs the count clock signal CTCK. The count clock signal CTCK is a signal based on the reference clock signal CKF.

The integration processing unit 156 receives multiplication results QM (for example, angle displacement) of the multiplication processing unit 155, and performs integration processing for the multiplication results QM. As a result, integration processing of the angular velocity information QG is realized. Then, the integration processing unit 156 outputs a rotation number information QH. The rotation number information QH includes integer part REVQ and decimal part DEGQ of fixed-point notation.

Figure 11B:
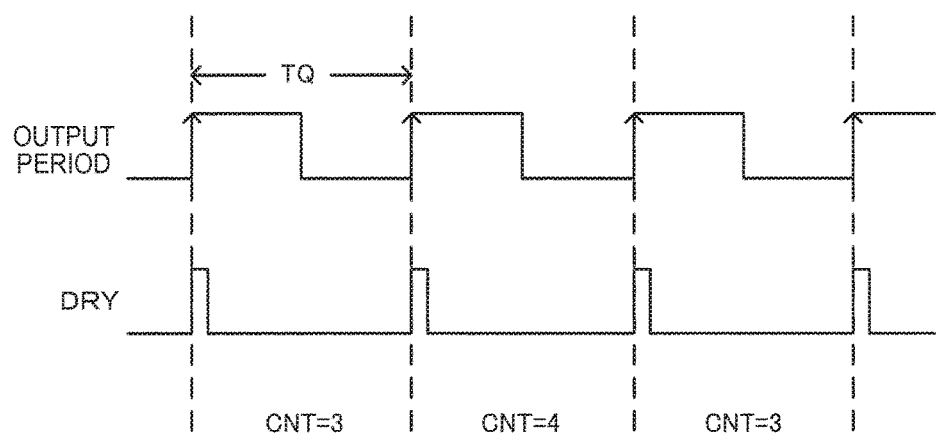

FIG. 11B is an operation explanatory diagram of the arithmetic processing unit 150 of FIG. 11A. In the present embodiment, the arithmetic processing unit 150 performs arithmetic processing, using the number of edges of the reference clock signal CKF during an output period duration (TQ) of the angular velocity information QG as time interval information. The counter 154 of FIG. 11A is a counter for counting the number of edges. That is, the counter 154 performs a count operation based on the count clock signal CTCK from the count clock generation circuit 152, and outputs the count value CNT. In addition, the counter 154 receives the signal DRY (data ready signal), and if the signal DRY becomes active, the count value CNT retained in the counter 154 is reset.

The signal DRY is a data ready signal of the detection circuit 60 (DSP unit) in a preceding stage of the arithmetic processing unit 150. For example, whenever the angular velocity information QG (digital data of angular velocity) from the detection circuit 60 is output, the signal DRY becomes active (H level) as illustrated in FIG. 11B. That is, in each output period duration (TQ) of the angular velocity information QG from the detection circuit 60, the signal DRY becomes active, and the count value CNT of the counter 154 is reset to "0" which is an initial value.

For example, during a first output period duration of FIG. 11B, a count value is counted up to "3" (CNT=3), and thereafter, the count value is reset to zero by the signal DRY. During a second output period duration, a count value is counted up to "4" (CNT=4), and thereafter, the count value is reset to zero by the signal DRY. During a third output period duration, a count value is counted up to "3" (CNT=3), and thereafter, the count value is reset to zero by the signal DRY. As the counter 154 operates in this way, the number of edges (the number of rising edges) of the reference clock signal CKF is counted during each output period duration, and the number of edges can be output to the multiplication processing unit 155 as the count value CNT, as illustrated in FIG. 6A. As a result, the arithmetic processing unit 150 can perform arithmetic processing by using the count value CNT corresponding to the number of edges of the reference clock signal CKF, as time interval information.

That is, "3" of 3×(1/fr)=3×TR corresponding to a time interval of the first output period duration of FIG. 6A corresponds to the count value CNT (CNT=3) of the first output period duration of FIG. 11B. "4" of 4×(1/fr)=4×TR corresponding to a time interval of the second output period duration of FIG. 6A corresponds to the count value CNT (CNT=4) of the second output period duration of FIG. 11B. "3" of 3×(1/fr)=3×TR corresponding to a time interval of the third output period duration of FIG. 6A corresponds to the count value CNT (CNT=3) of the third output period duration of FIG. 11B.

The multiplication processing unit 155 performs processing of multiplying the angular velocity information QG and the count value CNT together, and thus arithmetic processing based on time interval information which is defined by a drive frequency of the drive circuit 30 is realized. Specifically, arithmetic processing which uses the count value CNT as time interval information is realized.

In addition, the arithmetic coefficient CF is a coefficient in which a value based on a drive frequency of the drive circuit 30 that will be described below is set. More specifically, the arithmetic coefficient CF is a coefficient in which a value based on setting sensitivity of a drive frequency and angular velocity information is set. The multiplication processing unit 155 performs processing of multiplying the angular velocity information QG and the arithmetic coefficient CF together, and thus arithmetic processing based on time interval information which is defined by a drive frequency of the drive circuit 30 is realized.

Figure 12:
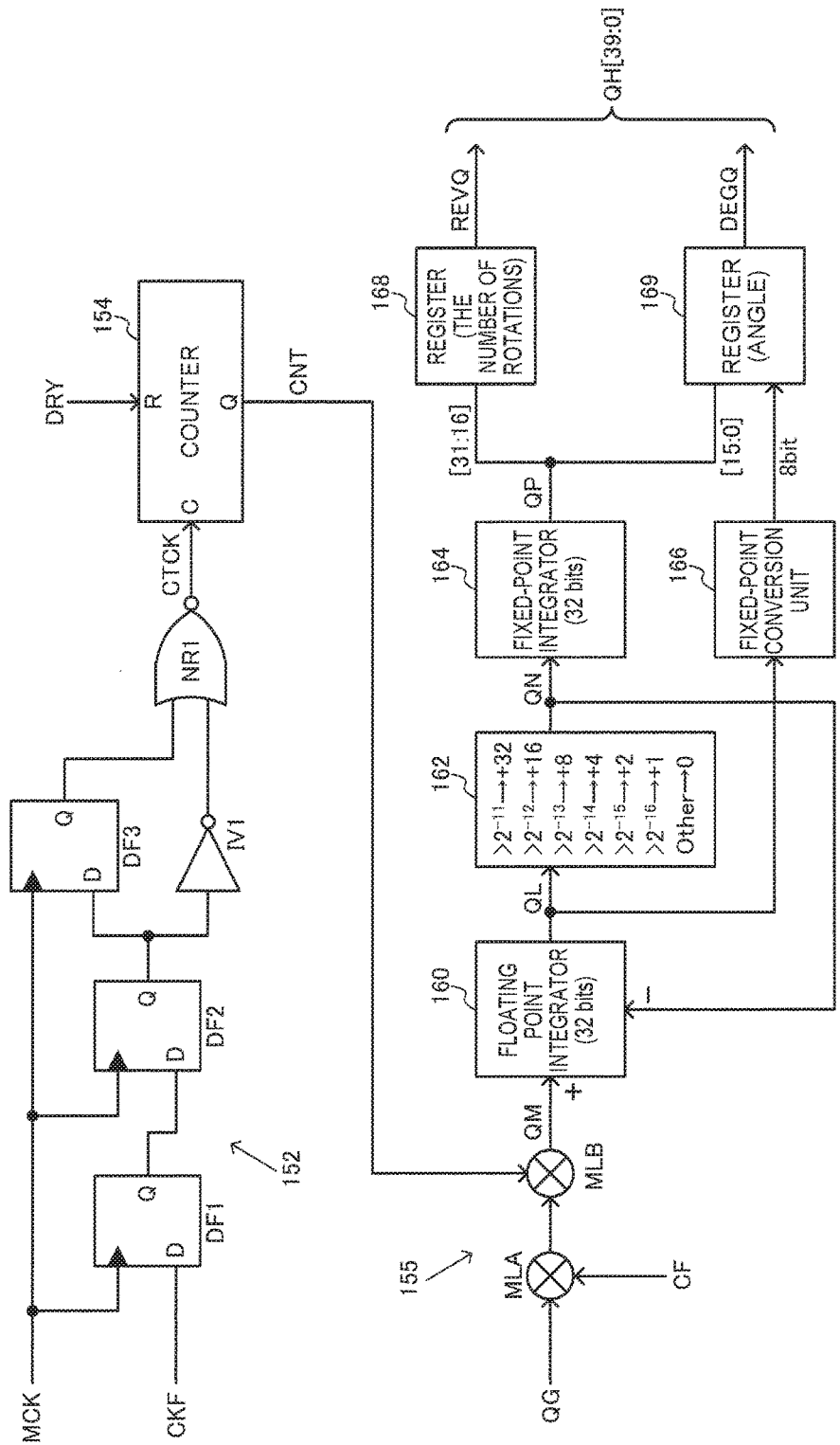

FIG. 12 is a detailed configuration example of the count clock generation circuit 152, the multiplication processing unit 155, and the integration processing unit 156. The count clock generation circuit 152, the multiplication processing unit 155, and the integration processing unit 156 are not limited to the configuration of FIG. 12, and can be implemented in various modifications such as, omitting a part of configuration elements thereof or adding other configuration elements.

The count clock generation circuit 152 includes flip-flop circuits DF1, DF2, and DF3, an inverter circuit IV1, and a NOR circuit NR1. The clock signal MCK which is a master clock is input to clock terminals of the flip-flop circuits DF1, DF2, and DF3. The reference clock signal CKF is input to a data terminal of the flip-flop circuit DF1. An output signal of the flip-flop circuit DF1 is input to a data terminal of the flip-flop circuit DF2, and an output signal of the flip-flop circuit DF2 is input to a data terminal of the flip-flop circuit DF3. The NOR circuit NR1 receives a signal obtained by inverting the output signal of the flip-flop circuit DF2 using the inverter circuit IV1, and an output signal of the flip-flop circuit DF3, and outputs the count clock signal CTCK.

That is, the arithmetic processing unit 150 according to the present embodiment operates based on the clock signal MCK which is a master clock. The clock signal MCK is generated by a clock signal generation circuit which includes, for example, a CR oscillation circuit. Meanwhile, the reference clock signal CKF (crystal gyro clock signal) is a signal which is generated based on a signal from the drive circuit 30, and is asynchronous to the clock signal MCK. For this reason, the count clock generation circuit 152 performs transfer of clock, and thereafter, detects rising edge of the reference clock signal CKF, and generates the count clock signal CTCK of a pulse signal which becomes active at the rising edge. The counter 154 performs a count-up operation of the count value CNT, based on the count clock signal CTCK. Then, the count value CNT of the counter 154 is reset by data rate (synchronous to the signal DRY) of the angular velocity information QG. As a result, the number of rising edges of the reference clock signal CKF, which is included in one period (TQ) of the data rate of the angular velocity information QG, is counted as the count value CNT, as illustrated in FIG. 11B.

The multiplication processing unit 155 includes multipliers MLA and MLB. Only one multiplier may be provided in the multiplication processing unit 155, and multiplication processing may be performed in time division. The multiplication processing unit 155 performs multiplication processing of multiplying the count value CNT corresponding to the number of rising edges and the arithmetic coefficient CF (constant) together, with respect to the angular velocity information QG (gyro signal). As a result, angle displacement ($\Delta\theta$) in a time interval of data rate is calculated. The angle displacement is obtained by multiplication processing of multiplying the angular velocity (QG) and a time interval together. Then, the time interval is set by the count value CNT and the arithmetic coefficient CF.

The configurations of the count clock generation circuit 152 and the counter 154 may be omitted, and the multiplication processing may be performed by setting the time interval using the arithmetic coefficient CF without using the count value CNT.

The arithmetic coefficient CF which is input to the multiplication processing unit 155 is represented by, for example, the following expression (1).

$$CF = \frac{1}{360 \times SEN \times fxt} \quad (1)$$

In the above expression (1), SEN represents setting sensitivity (LSB/dps), fxt represents a drive frequency (Hz) of the vibrating reed 10 (crystal vibrating reed). Specifically, the setting sensitivity SEN is sensitivity of angular velocity which is set as specifications (design value) of a physical quantity detection device (gyro sensor). That is, the setting sensitivity SEN is uniquely determined as specifications of products so as to be, for example, SEN=300 (LSB/dps). In addition, fxt is a drive frequency which is measured in a state in which a circuit device and the vibrating reed 10 are coupled to each other. That is, fxt is set based on measurement results of a drive frequency. The arithmetic coefficient CF is not limited to expression (1), and can be implemented in various modifications such as a coefficient obtained by multiplying expression (1) and a predetermined constant together.

In this way, in the present embodiment, arithmetic processing (multiplication processing) of the arithmetic processing unit 150 is performed by using the arithmetic coefficient CF in which a value is set based on the drive frequency (fxt) of the drive circuit 30 and setting sensitivity (SEN) of angular velocity (physical quantity information). Then, the drive frequency (fxt) which is used for setting the arithmetic coefficient CF is set based on measurement results of the drive frequency. Specifically, in the present embodiment, the arithmetic coefficient CF of the above expression (1) is written to the non-volatile memory 146 as drive frequency information (information whose value is set based on a drive frequency). Then, the arithmetic processing unit 150 reads the arithmetic coefficient CF from the non-volatile memory 146 as the drive frequency information, and performs arithmetic processing based on the time interval information which is defined by the drive frequency information.

In the drive frequency of the drive circuit 30, fluctuation occurs with respect to a design value. For example, fluctuation occurs with respect to a design value (50 KHz to 200 KHz) of the drive frequency. Then, in the present embodiment, since time interval information in arithmetic processing of the arithmetic processing unit 150 is defined by a drive frequency, fluctuation also occurs in the arithmetic results, if fluctuation occurs in the drive frequency. For example, a detection target actually rotates only 10 degrees, and if fluctuation occurs in the drive frequency, a rotation angle which is arithmetic results of the arithmetic processing unit 150 does not become 10 degrees, and becomes an angle deviated from 10 degrees.

Regarding this point, in the present embodiment, the drive frequency is measured in a state in which the vibrating reed 10 and a circuit device are coupled to each other, and as described in the above expression (1), the arithmetic coefficient CF (drive frequency information in a broad sense) is obtained based on the measured drive frequency (fxt) to be stored in the non-volatile memory 146. Then, the arithmetic processing unit 150 performs arithmetic processing based on the arithmetic coefficient CF which is read from the non-volatile memory 146. Hence, since time interval information which is used for arithmetic processing is defined based on the measured drive frequency (fxt), the arithmetic processing unit 150 can output more correct arithmetic results, even if fluctuation occurs in the drive frequency.

In addition, for angular velocity which is detected by the detection circuit 60, sensitivity correction is performed by a DSP unit 110 of FIG. 14 which will be described below, and the angular velocity is corrected such that sensitivity of the angular velocity becomes setting sensitivity which is a design value. A value of the setting sensitivity can be changed depending on the products of a physical quantity detection device, and thus, if the arithmetic processing unit 150 performs arithmetic processing of integration processing or the like without considering the setting sensitivity, correct arithmetic results cannot be obtained.

Regarding this point, in the present embodiment, as described in above expression (1), the arithmetic coefficient CF based on the setting sensitivity SEN is obtained, and the arithmetic processing unit 150 performs arithmetic processing based on the arithmetic coefficient CF. Hence, arithmetic processing can be performed by the arithmetic coefficient CF according to sensitivity of angular velocity which is output from the detection circuit 60. For example, if setting sensitivity SEN is 300 (LSB/dps), the sensitivity of the angular velocity which is output from the detection circuit is also set to 300 (LSB/dps), and by multiplying the arithmetic coefficient CF in which the setting sensitivity is set to denominator as described in the above expression (1), and angular velocity from the detection circuit 60 together, it is possible to obtain correct arithmetic results which does not depend on sensitivity.

The integration processing unit 156 includes a floating point integrator 160 (floating point multiplication processing unit) and a fixed-point integrator 164 (fixed-point multiplication processing unit). In addition, the integration processing unit 156 can include a detector 162, a fixed-point conversion unit 166, and registers 168 and 169.

The floating point integrator 160 performs of multiplication processing of angle displacement ($\Delta\theta = \omega \times t$) of a floating point type, and calculates an angle. Here, in order to perform multiplication processing without decreasing accuracy of floating point arithmetic, it is preferable that a value of the output of the floating point integrator 160 is maintained in a small value (for example, smaller than or equal to $2^{-16}$) all the time. Hence, if the value of the output of the floating point integrator 160 exceeds a constant value, processing of subtracting the amount is performed. If the detector 162 determines that the value of the output of the floating point integrator 160 exceeds, for example, $2^{-16}$, processing of subtracting the amount of subtraction of a magnitude of, for example, "+1" from the integration results (output value) is performed, and processing of adding the amount of addition "+1" corresponding to the amount of subtraction to another fixed-point integrator 164 is performed. Conversion into a fixed-point is also performed at this timing. In the same manner, if it is determined that the value of the output of the floating point integrator 160 exceeds, for example, $2^{-15}$, processing of subtracting the amount of subtraction of a magnitude of, for example, "+2" from the integration results is performed, and processing of adding the amount of addition "+2" corresponding to the amount of subtraction to another fixed-point integrator 164 is performed. The amount of subtraction and the amount of addition in a case of exceeding $2^{-14}$, $2^{-13}$, $2^{-12}$, and $2^{-11}$, respectively become "+4", "+8", "+16", and "+32".

Then, an output or the like of the fixed-point integrator 164 is output through the registers 168 and 169, as integer part REVQ and decimal part DEGQ of rotation number information.

In FIG. 12, with regard to small angle components (8 lower bits), an output of the floating point integrator 160 of floating point notation is directly converted without passing through a fixed-point integrator 164 described above. For example, if a value indicated by an exponential part of, for example, floating point is $2^{-15}$, the eighth bit is set to "1", seven higher bits of a mantissa part of a floating point is output as seven lower bits, and thus conversion into a fixed-point is performed. This conversion is performed by the fixed-point conversion unit 166, and the obtained fixed-point of 8 bits is output to the register 169. In the same manner, if a value indicated by an exponential part of a floating point is $2^{-14}$, the eighth bit and the seventh bit is respectively set to "0", and "1", six higher bits of a mantissa part of a floating point is output as six lower bits, and thus conversion into a fixed-point is performed.

As described above, in FIG. 12, the arithmetic processing unit 150 performs arithmetic processing for the angular velocity information QG (physical quantity information) of floating point notation, and outputs the rotation number information QH (after-arithmetic physical quantity information) of fixed-point notation. The rotation number information QH (angle information) of the fixed-point notation is configured by integer part REVQ and decimal part DEGQ.

5. Posture Arithmetic

In the above description, a case in which arithmetic processing performed by the arithmetic processing unit 150 is integration processing based on physical quantity information of angular velocity or the like is used as an example, but the present embodiment is not limited to this. The arithmetic processing performed by the arithmetic processing unit 150 may be posture arithmetic processing based on physical quantity information.

Arithmetic processing or the like which uses quaternion described in the below expression (2) is considered as the posture arithmetic processing.

$$\tilde{q} = q_0 + q_1 i + q_2 j + q_3 k \qquad (2)$$

The quaternion is such that four components configured by a rotation axis (vector part) and a rotation angle (scalar part) represent rotation or the like of three-dimensional space. For example, in the above expression (2), $q_0$ represents a scalar part, and ($q_1$, $q_2$, $q_3$) represents a vector part. The quaternion is called a four-dimensional number. According to quaternion expression, there is an advantage in which a specific point that is generated by rotation expression caused by an Eulerian angle does not exist, and thus the quaternion is widely used for posture arithmetic processing or the like in a three-dimensional space.

The amount of change $\Delta q_0$, $\Delta q_1$, $\Delta g_2$, and $\Delta g_3$ of each component of quaternion in a very short time $\Delta t$ is obtained by arithmetic processing described in the below expressions (3), (4), (5), and (6), using angular velocity $\omega_1$, $\omega_2$, and $\omega_3$, of each axis.

$$\Delta q_0 = \qquad (3)$$
$$-\frac{1}{2}\omega_1 q_1 \Delta t - \frac{1}{2}\omega_2 q_2 \Delta t - \frac{1}{2}\omega_3 q_3 \Delta t = -\frac{1}{2}q_1 \Delta\theta_1 - \frac{1}{2}q_2 \Delta\theta_2 - \frac{1}{2}q_3 \Delta\theta_3$$

$$\Delta q_1 = \qquad (4)$$
$$\frac{1}{2}\omega_1 q_0 \Delta t - \frac{1}{2}\omega_3 q_1 \Delta t + \frac{1}{2}\omega_2 q_3 \Delta t = \frac{1}{2}q_0 \Delta\theta_1 - \frac{1}{2}q_2 \Delta\theta_3 + \frac{1}{2}q_3 \Delta\theta_2$$

$$\Delta q_2 = \qquad (5)$$
$$\frac{1}{2}\omega_2 q_0 \Delta t + \frac{1}{2}\omega_3 q_1 \Delta t - \frac{1}{2}\omega_1 q_3 \Delta t = \frac{1}{2}q_0 \Delta\theta_2 + \frac{1}{2}q_1 \Delta\theta_3 - \frac{1}{2}q_3 \Delta\theta_1$$

$$\Delta q_3 = \qquad (6)$$
$$\frac{1}{2}\omega_3 q_0 \Delta t - \frac{1}{2}\omega_2 q_1 \Delta t + \frac{1}{2}\omega_1 q_2 \Delta t = \frac{1}{2}q_0 \Delta\theta_3 - \frac{1}{2}q_1 \Delta\theta_2 + \frac{1}{2}q_2 \Delta\theta_1$$

The arithmetic processing unit 150 performs arithmetic processing described in, for example, expressions (3), (4), (5), and (6), as posture arithmetic processing based on angular velocity which is physical quantity information. That is, the arithmetic processing unit 150 performs arithmetic processing of updating quaternion, based on angular velocity information ($\omega_1$, $\omega_2$, $\omega_3$) and time interval information ($\Delta t$), and performs posture arithmetic processing of a detection target. For example, the arithmetic processing unit 150 includes an arithmetic circuit which performs arithmetic processing of the above expressions (3), (4), (5), and (6), and angular displacement components ($\Delta\theta_1$, $\Delta\theta_2$, $\Delta\theta_3$) obtained based on angular velocity information and time interval information are input to an integrator (multiplication processing unit) provided in the arithmetic circuit. Update expressions of quaternion of the above expressions (3), (4), (5), and (6) are defined at a very short time, and updating as fast as possible is effective in reducing error.

6. Detailed Configuration of an Electronic Apparatus, a Gyro Sensor, and a Circuit Device FIG. 13 illustrates a detailed configuration example of a circuit device 20 according to the present embodiment, a gyro sensor 510 (physical quantity detection device in a broad sense) including the circuit device 20, and an electronic apparatus 500 including the gyro sensor 510.

Figure 13:
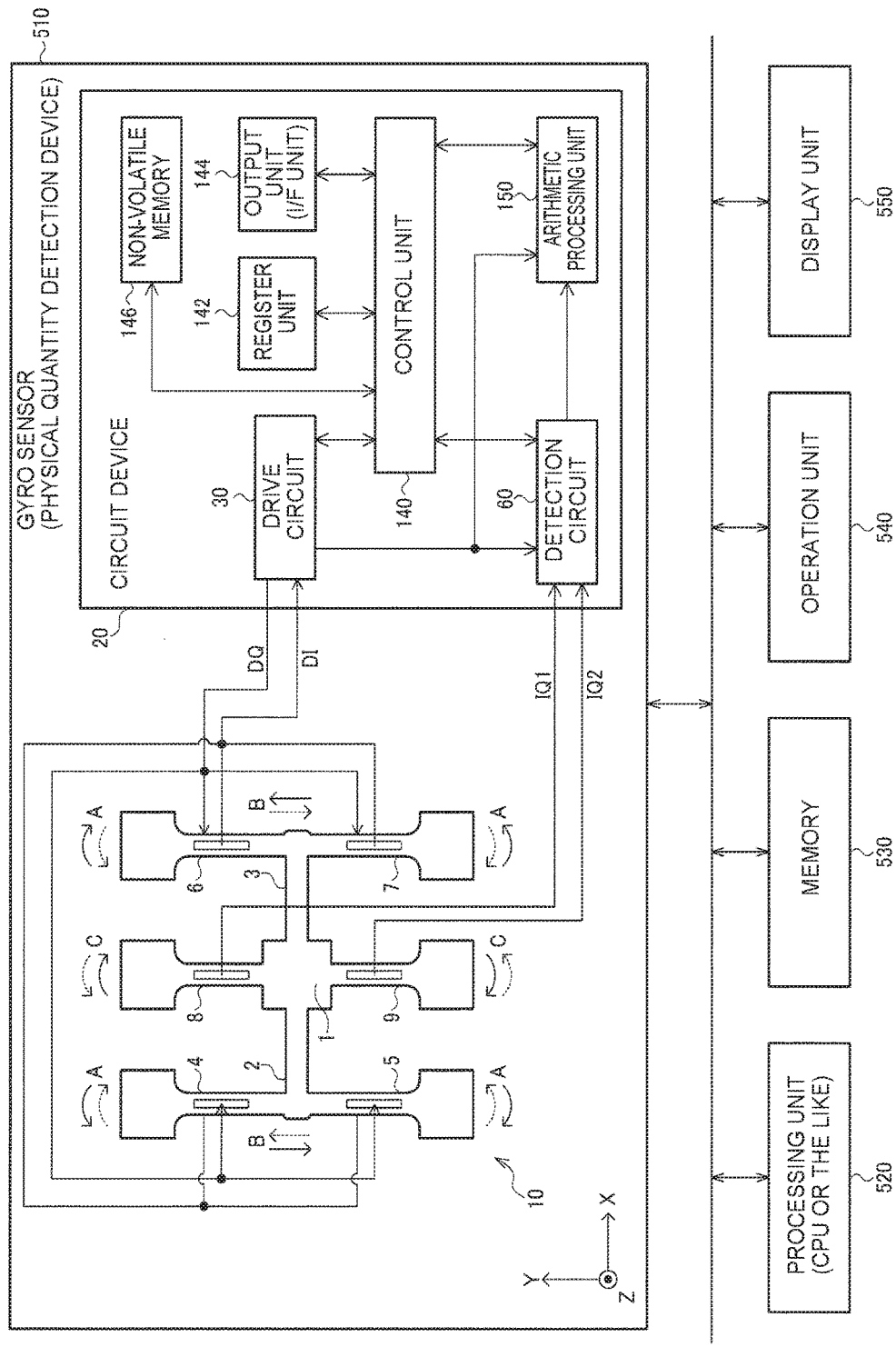
FIG. 13 is a configuration example of a circuit device, an electronic apparatus, and a gyro sensor (physical quantity detection device) according to the present embodiment.

The circuit device 20, the electronic apparatus 500, and the gyro sensor 510 are not limited to the configuration of FIG. 13, and can be implemented by various modifications such as, omitting a part of configuration elements thereof or adding other configuration elements. In addition, various apparatuses such as, a digital camera, a video camera, a smart phone, a cellular phone, a car navigation system, a robot, a living body information detection apparatus, a game machine, a clock, a health appliance, and a portable information terminal, can be included in the electronic apparatus 500 according to the present embodiment. In addition, hereinafter, a case in which a physical quantity transducer (angular velocity sensor element) is a vibrating reed (vibration gyro) of a piezoelectric type, and a sensor is a gyro sensor will be described as an example, but the invention is not limited to this. For example, the invention can also be applied to a vibration gyro of a capacitance detection type which is formed of a silicon substrate or the like, a physical quantity transducer for detecting a physical quantity equivalent to angular velocity information or a physical quantity other than angular velocity information, or the like.

The electronic apparatus 500 includes the gyro sensor 510 and a processing unit 520. In addition, the electronic apparatus 500 can include a memory 530, an operation unit 540, and a display unit 550. The processing unit 520 (external processing device) which is realized by a CPU, an MPU, or the like performs a control of the gyro sensor 510 or the like, and the entire control of the electronic apparatus 500. In addition, the processing unit 520 performs processing based on angular velocity information (physical quantity in a broad sense) which is detected by the gyro sensor 510. For example, the processing unit 520 performs processing for hand shake correction, a posture control, GPS autonomous navigation, or the like, based on angular velocity information. The memory 530 (ROM, RAM, or the like) stores a control program or various data, and functions as a work area or a data storage area. The operation unit 540 is used for a user to operate the electronic apparatus 500, and the display unit 550 displays various information items for a user.

The gyro sensor 510 (physical quantity detection device) includes the vibrating reed 10 and the circuit device 20. The vibrating reed 10 (physical quantity transducer and angular velocity sensor element in a broad sense) is a piezoelectric vibrating reed which is formed of a thin plate of a piezoelectric material such as crystal. Specifically, the vibrating reed 10 is a double T-shaped vibrating reed which is formed by a crystal substrate of Z-cut.

The circuit device 20 includes the drive circuit 30, the detection circuit 60, the control unit 140, the register unit 142, the output unit 144, the non-volatile memory 146, and the arithmetic processing unit 150. Various modifications such as, omitting a part of the configuration elements or adding other configuration elements can be implemented.

The drive circuit 30 outputs the drive signal DQ and drives the vibrating reed 10. For example, the drive circuit 30 receives the feedback signal DI from the vibrating reed 10 and outputs the drive signal DQ corresponding to the feedback signal DI, and thereby the vibrating reed 10 is excited. The detection circuit 60 receives detection signals IQ1 and IQ2 (detection current, electric charges) from the vibrating reed which is driven by the drive signal DQ, and detects (extracts) a desired signal (Coriolis force signal) according to a physical quantity which is applied to the vibrating reed 10 from the detection signals IQ1 and IQ2.

The vibrating reed 10 includes a base 1, connecting arms 2 and 3, drive arms 4, 5, 6, and 7, and detecting arms 8 and 9. The detecting arms 8 and 9 extend in the +Y-axis direction and −Y-axis direction with respect to the base 1 of a rectangular shape. In addition, the connecting arms 2 and 3 extend in the −X-axis direction and +X-axis direction with respect to the base 1. Then, the drive arms 4 and 5 extend in the +Y-axis direction and −Y-axis direction with respect to the connecting arm 2, and the drive arms 6 and 7 extend in the +Y-axis direction and −Y-axis direction with respect to the connecting arm 3. The X-axis, the Y-axis, and the Z-axis denote axes of crystal, and are respectively called an electrical axis, a mechanical axis, and an optic axis.

The drive signal DQ from the drive circuit 30 is input to a drive electrode provided on an upper surface of the drive arms 4 and 5, and a drive electrode provided on a side surface of the drive arms 6 and 7. In addition, signals from drive electrodes provided on side surfaces of the drive arms 4 and 5, and drive electrodes provided on upper surfaces of the drive arms 6 and 7 are input to the drive circuit 30 as the feedback signal DI. In addition, signals from detection electrodes provided on upper surfaces of the detecting arms 8 and 9 are input to the detection circuit 60 as the detection signals IQ1 and IQ2. A common electrode provided on side surfaces of the detecting arms 8 and 9 is grounded, for example.

If the drive signal DQ of AC is applied by the drive circuit 30, the drive arms 4, 5, 6, and 7 perform bending vibration (excitation vibration) by piezoelectric effects as denoted by arrows A. That is, bending vibration is performed in which tips of the drive arms 4 and 6 repeat approaching and separating from each other, and tips of the drive arms 5 and 7 repeat approaching and separating from each other. At this time, since the drive arms 4 and 5 and the drive arms 6 and 7 perform vibration of line symmetry with respect to the Y axis which passes through the center position of the base 1, the base 1, the connecting arms 2 and 3, and the detecting arms 8 and 9 do not vibrate nearly.

In this state, if angular velocity is applied to the vibrating reed 10 by using the Z axis as a rotation axis (the vibrating reed 10 rotates in the Z axis), the drive arms 4, 5, 6, and 7 is vibrated by Coriolis force as denoted by arrows B. That is, Coliolis force in the direction of the arrows B orthogonal to the direction of the arrows A and the Z-axis direction acts on the drive arms 4, 5, 6, and 7, and thus the vibration components of the direction of the arrows B are generated. The vibration of the arrows B is transferred to the base 1 through the connecting arms 2 and 3, and the detecting arms 8 and 9 perform bending vibration in a direction of arrows C. Electric charge signals generated by piezoelectric effects due to bending vibration of the detecting arms 8 and 9 are input to the detection circuit 60 as the detection signals IQ1 and IQ2. Here, the vibration of the arrows B of the drive arms 4, 5, 6, and 7 is vibration in a peripheral direction with respect to the center position of the base 1, and vibration of the detecting arms 8 and 9 is vibration in the direction of the arrows C in a direction opposite to the arrows B in a peripheral direction. For this reason, the detection signals IQ1 and IQ2 become signals in which a phase is shifted by 90 degrees with respect to the drive signal DQ.

For example, if angular velocity of the vibrating reed 10 (gyro sensor) in the Z-axis is referred to as $\omega$, mass is referred to as m, and vibration speed is referred to as v, Coriolis force is represented by $Fc=2m \cdot v \cdot \omega$. Hence, the detection circuit 60 detects a desired signal which is a signal according to Coriolis force, and thus angular velocity $\omega$ can be obtained. Then, by using the obtained angular velocity $\omega$, the processing unit 520 can perform various processing for hand shake correction, posture control, GPS autonomous navigation, or the like.

FIG. 13 illustrates an example of a case in which the vibrating reed 10 has a double T-shape, but the vibrating reed 10 according to the present embodiment is not limited to the structure. The vibrating reed 10 may be, for example, a tuning-fork type, an H type, or the like. In addition, a piezoelectric material of the vibrating reed 10 may be a material such as ceramic or silicon other than crystal.

Figure 14:
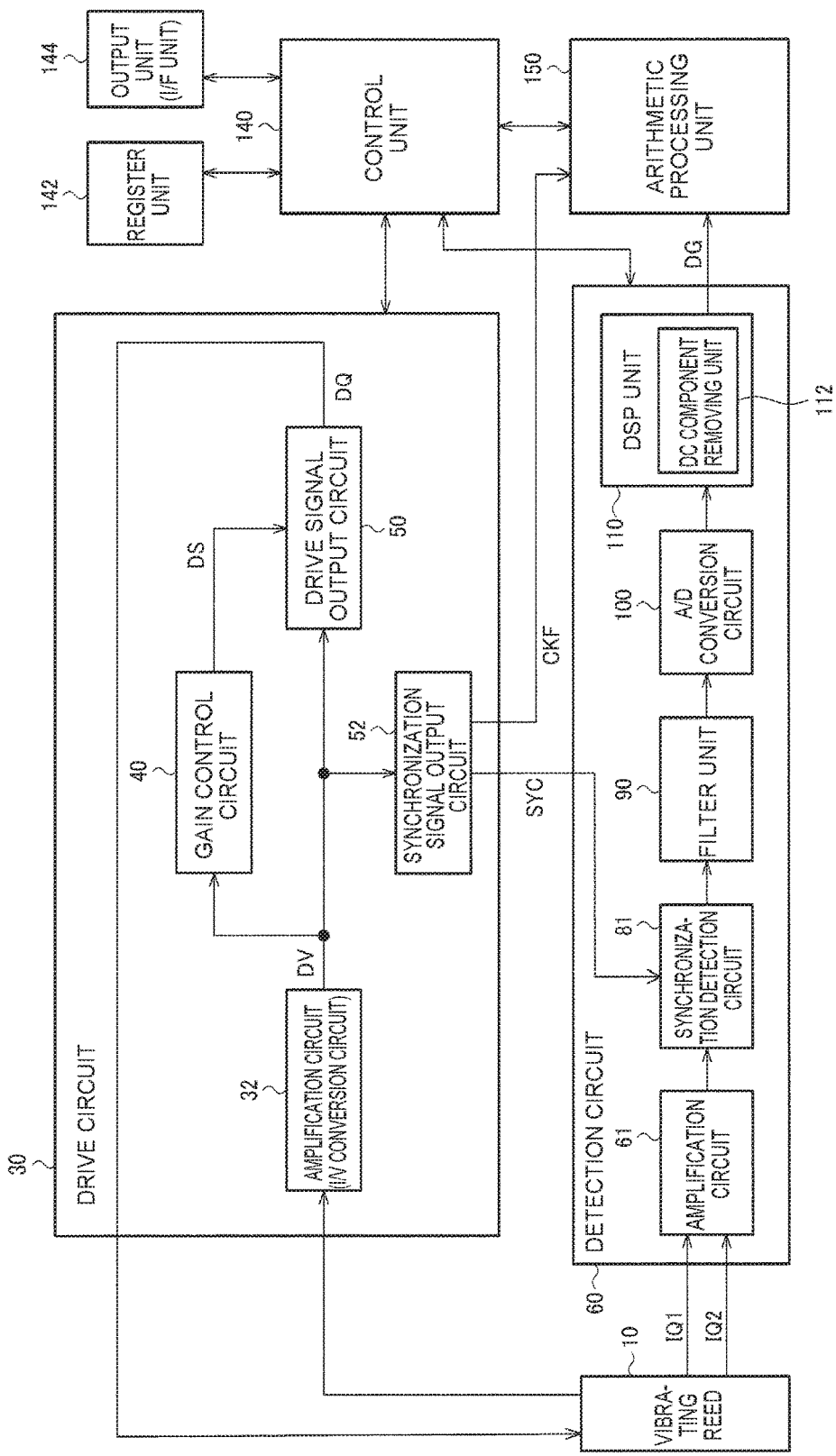
FIG. 14 is a detailed configuration example of a drive circuit and a detection circuit.

FIG. 14 illustrates a detailed configuration example of the drive circuit 30 and the detection circuit 60 of the circuit device.

The drive circuit 30 includes an amplification circuit 32 to which the feedback signal DI from the vibrating reed 10 is input, a gain control circuit 40 which performs an automatic gain control, and a drive signal output circuit 50 which outputs the drive signal DQ to the vibrating reed 10. In addition, the drive circuit 30 includes a synchronization signal output circuit 52 which outputs a synchronization signal SYC to the detection circuit 60. A configuration of the drive circuit 30 is not limited to FIG. 14, and can be made by various modifications such as, omitting a part of configuration elements thereof or adding other configuration elements.

The amplification circuit 32 (I/V conversion circuit) amplifies the feedback signal DI from the vibrating reed 10. For example, the amplification circuit 32 converts the signal DI of a current from the vibrating reed 10 into a signal DV of a voltage, and outputs the converted signal. The amplification circuit 32 can be realized by an operational amplifier, a feedback resistor element, a feedback capacitor, or the like.

The drive signal output circuit 50 outputs the drive signal DQ, based on the signal DV which is amplified by the amplification circuit 32. For example, if the drive signal output circuit 50 outputs a drive signal of a rectangular wave (or sine wave), the drive signal output circuit 50 can be realized by a comparator or the like.

The gain control circuit 40 (AGC) outputs a control voltage DS to the drive signal output circuit 50, and controls amplitude of the drive signal DQ. Specifically, the gain control circuit 40 monitors the signal DV, and controls a gain of an oscillation loop. For example, in order to maintain sensitivity of a gyro sensor constant, the drive circuit 30 needs to maintain amplitude of a drive voltage which is supplied to the vibrating reed 10 (vibrating reed for drive), constant. For this reason, the gain control circuit 40 for automatically adjusting a gain is provided within an oscillation loop of a drive vibration system. The gain control circuit 40 variably performs automatic adjustment of a gain, such that amplitude (vibration speed v of a vibrating reed) of the feedback signal DI from the vibrating reed 10 is maintained constant. The gain control circuit 40 can be realized by a full-wave rectifier which performs full-wave rectification of the output signal DV of the amplification circuit 32, an integrator which performs integration processing of an output signal of the full-wave rectifier, or the like.

The synchronization signal output circuit 52 receives the signal DV amplified by the amplification circuit 32, and outputs the synchronization signal SYC (reference signal) to the detection circuit 60. The synchronization signal output circuit 52 can be realized by a comparator which performs binary processing of the signal DV of a sine wave (AC) to generate the synchronization signal SYC of a rectangular wave, a phase adjustment circuit (phase shifter) which performs phase adjustment of the synchronization signal SYC, or the like.

In addition, the synchronization signal output circuit 52 outputs the reference clock signal CKF to the arithmetic processing unit 150. For example, the synchronization signal output circuit 52 includes a comparator which performs binary processing of the signal DV of a sine wave. Then, for example, a signal which is obtained by buffering an output signal of the comparator using a first buffer circuit becomes the synchronization signal SYC, and a signal which is obtained by buffering an output signal of the comparator using a second buffer circuit becomes the reference clock signal CKF. As a result, for example, the reference clock signal CKF and the synchronization signal have the same frequency. A first comparator for generating the synchronization signal SYC and a second comparator for generating the reference clock signal CKF may be provided.

In addition, while not illustrated in FIG. 14, a clock signal generation circuit which generates the clock signal MCK which becomes a master clock for an A/D conversion circuit 100, a DSP unit 110, the control unit 140, the arithmetic processing unit 150, or the like, is provided in the circuit device 20. The clock signal generation circuit generates the clock signal MCK using, for example, a CR oscillation circuit or the like, but the present embodiment is not limited to this.

The detection circuit 60 includes an amplification circuit 61, a synchronization detection circuit 81, a filter unit 90, the A/D conversion circuit 100, and the DSP unit 110. The amplification circuit 61 receives the first and second detection signals IQ1 and IQ2 from the vibrating reed 10, and performs current-voltage conversion, differential signal amplification, gain adjustment, and the like. The synchronization detection circuit 81 performs synchronization detection based on the synchronization signal SYC from the drive circuit 30. The filter unit 90 (low pass filter) functions as a pre-filter of the A/D conversion circuit 100. In addition, the filter unit 90 functions as a circuit which attenuates an unnecessary signal which is not removed by synchronization detection. The A/D conversion circuit 100 performs A/D conversion of a signal which is obtained by performing synchronization detection. The DSP unit 110 performs digital signal processing such as, digital filter processing or digital correction processing, with respect to a digital signal from the A/D conversion circuit 100. There is, for example, zero-point correction processing, sensitivity correction processing, or the like, as the digital correction processing.

For example, phases of the first detection signals IQ1 and IQ2 which are electric charge signal (current signal) from the vibrating reed 10 are delayed by 90 degrees with respect to the drive signal DQ which is a voltage signal. In addition, a phase of a Q/V conversion circuit or the like of the amplification circuit 61 is delayed by 90 degrees. For this reason, a phase of an output signal of the amplification circuit 61 is delayed by 180 degrees with respect to the drive signal DQ. Hence, for example, synchronization detection is performed by using the synchronization signal SYC with the same phase as the drive signal DQ (DV), and thus, it is possible to remove an unnecessary signal or the like with a phase delayed by 90 degrees with respect to the drive signal DQ.

The control unit 140 performs control processing of the circuit device 20. The control unit 140 can be realized by a logic circuit (gate array or the like), a processor, or the like. Various switching controls, mode setting, or the like in the circuit device 20 are performed by the control unit 140.

7. DC Component Removing Unit

As illustrated in FIG. 14, the detection circuit 60 includes a DC component removing unit 112. Specifically, the DC component removing unit 112 is provided in the DSP unit 110 of the detection circuit 60, for example. Then, the DC component removing unit 112 extracts DC components of physical quantity information (angular velocity information or the like), and performs processing of removing DC components (offset components) from physical quantity information. Then, the arithmetic processing unit 150 performs various arithmetic processing described above, based on the physical quantity information (angular velocity information or the like) in which DC components are removed.

That is, the arithmetic processing unit 150 performs integration processing of physical quantity information of angular velocity information or the like. Hence, if DC components remain in the physical quantity information, those are integrated, and thus it is not possible to obtain correct arithmetic results.

Regarding this point, in the present embodiment, the detection circuit 60 includes the DC component removing unit 112, the DC component removing unit 112 extracts DC components of physical quantity information, and performs processing of removing DC components from physical quantity information. Hence, the arithmetic processing unit 150 performs integration processing or the like of physical quantity information in which DC components are removed, and thus correct arithmetic results can be output, compared to a case in which DC components are not removed.

Figure 15:
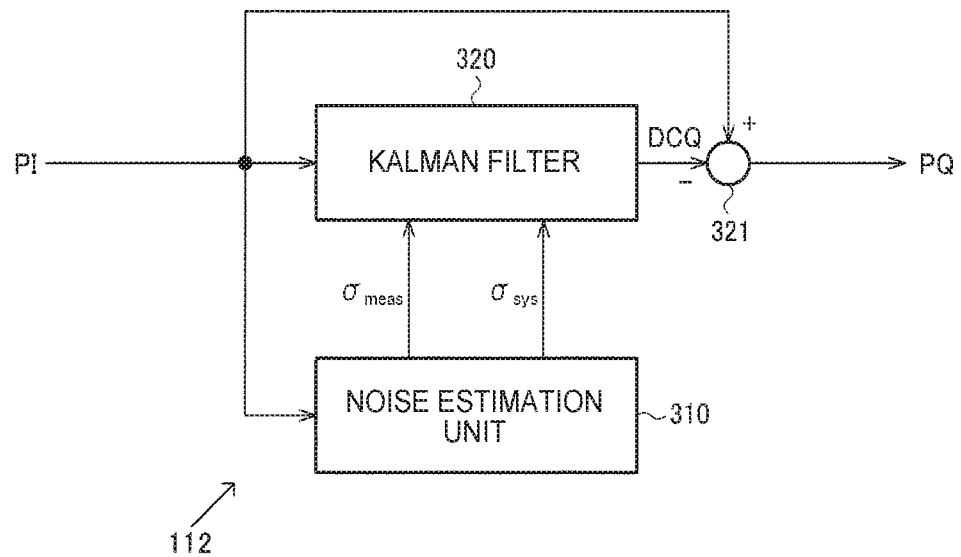
FIG. 15 is a configuration example of a DC component removing unit.

FIG. 15 illustrates a configuration example of the DC component removing unit 112. The DC component removing unit 112 includes a noise estimation unit 310, a Kalman filter 320, and a subtracting unit 321.

The noise estimation unit 310 receives a physical quantity signal PI (physical quantity information) as an input signal (input data), and estimates observation noise $\sigma_{meas}$ and system noise $\sigma_{sys}$ which dynamically change in accordance with the input signal PI. Specifically, the noise estimation unit 310 generates the observation noise $\sigma_{meas}$ and the system noise $\sigma_{sys}$ from the input signal PI, and changes the observation noise $\sigma_{meas}$ and the system noise $\sigma_{sys}$ in accordance with the value of the input signal PI or a change thereof.

The Kalman filter 320 performs Kalman filter processing based the observation noise $\sigma_{meas}$ and the system noise $\sigma_{sys}$, and extracts DC components DCQ of the input signal PI. The subtracting unit 321 subtracts the DC components DCQ from the input signal PI, and outputs an output signal PQ. The Kalman filter processing is processing of, by assuming that noise (error) is included in variables representing an observation value and a state of a system, estimating optimal state of a system using an observation value acquired from the past to the present. In FIG. 15, an observation value is the physical quantity signal PI (physical quantity information), and variables which are estimated are the DC components DCQ. Specifically, a state is estimated by repeating observation update (observation step) and time update (prediction step). Observation update indicates a step in which a Kalman gain, an estimated value, error covariance are updated by using an observation value and results of time update. Time update indicates a step in which an estimated value at the subsequent time and error covariance are predicted by using result of observation update.

A general Kalman filer has an initial value of error covariance and system noise which are already known, in advance. The value of Error covariance is updated by observation update or time update. In this way, a general Kalman filter does not receive newly observation noise or system noise from the outside, during repeating of update.

Meanwhile, in FIG. 15, the observation noise $\sigma_{meas}$ and the system noise $\sigma_{sys}$ are dynamically changed, and are supplied to the Kalman filter 320 from the outside. The observation noise $\sigma_{meas}$ and the system noise $\sigma_{sys}$ affect internal variables such as a Kalman gain g(k). That is, by controlling the observation noise $\sigma_{meas}$ and the system noise $\sigma_{sys}$, filter characteristics of the Kalman filter 320 can be controlled. In FIG. 15, by using this, when DC components of the physical quantity signal PI does not change, a passband is set to a low frequency, and a passband of signal components can be widened on a low frequency side. In addition, when DC components change, a passband is widened by changing the observation noise $\sigma_{meas}$ and the system noise $\sigma_{sys}$ and can follow the change of DC components. By doing so, it is possible to increase transient response with respect to the change of the physical quantity signal PI, or follow-up property with respect to the change of DC components.

Specifically, the noise estimation unit 310 estimates the observation noise $\sigma_{meas}$ based on the input signal PI, performs gain processing with respect to the estimated observation noise $\sigma_{meas}$, and thereby estimates the system noise $\sigma_{sys}$.

By doing so, the observation noise $\sigma_{meas}$ and the system noise $\sigma_{sys}$ can be dynamically changed in accordance with the input signal PI, and characteristics of the Kalman filter 320 can be controlled in accordance with the input signal PI. In addition, by changing the gain of gain processing, the system noise $\sigma_{sys}$ can be adjusted, and thereby it is possible to perform a control such that the Kalman filter 320 has desired characteristics.

More specifically, the noise estimation unit 310 performs a gain processing with respect the observation noise $\sigma_{meas}$, using a gain which is set based on a target cut-off frequency of a low pass filter operation in a convergence state of the Kalman filter 320.

If sufficient time passes after the Kalman filter 320 starts an operation, internal variables such as a Kalman gain converge to constant values, and the Kalman filter 320 converges to filter characteristics which include low pass filter characteristics. In the convergence state, a cut-off frequency fc of a low pass filter is determined by a gain GA1. In other words, the gain GA1 is set so as to obtain the desired cut-off frequency fc, and thus when the Kalman filter 320 enters a convergence state, it is possible to obtain low pass filter characteristics of the desired cut-off frequency fc.

It is possible to obtain an extremely low cut-off frequency of, for example, approximately 0.1 mHz in a convergence state by using the Kalman filter 320 in FIG. 15. As a result, it is possible to extract only extremely low frequency components from the physical quantity signal PI which is physical quantity information of angular velocity or the like, as the DC components DCQ, and to realize removal processing of DC components by subtracting the DC components DCQ.

The method of removing DC components is not limited to the method of FIG. 15, and can be implemented by various modifications such as, removing DC components using digital signal processing of a method different from the method of FIG. 15, or removing DC components using analog processing.

8. Moving Object and Electronic Apparatus

Figure 16B:
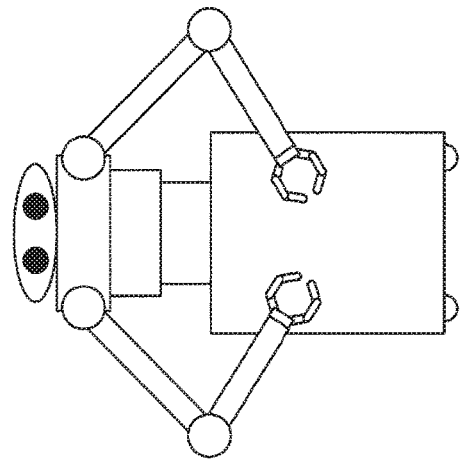
FIGS. 16A to 16D are examples of a moving object and an electronic apparatus in which the circuit device according to the present embodiment is built.
Figure 16D:
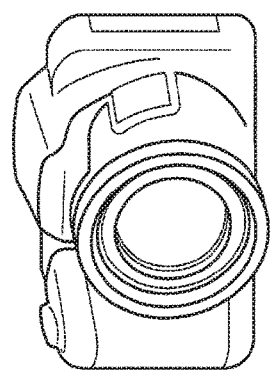
Figure 16A:
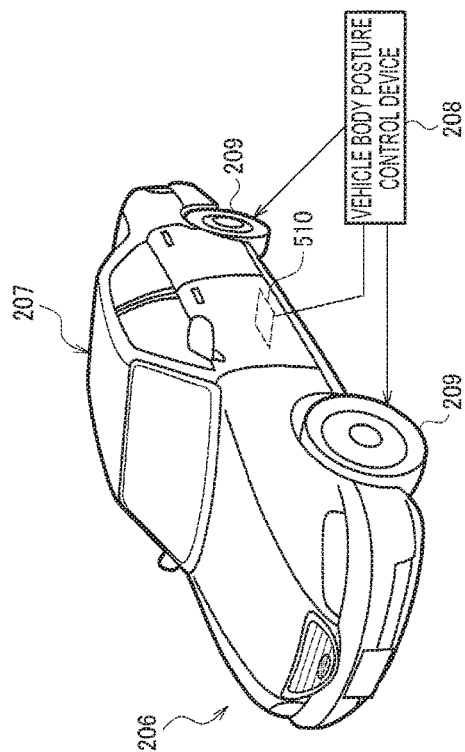

FIG. 16A illustrates an example of a moving object including the circuit device 20 according to the present embodiment. The circuit device 20 according to the present embodiment can be embedded in various moving objects such as, a vehicle, an airplane, a motorcycle, a bicycle, or a ship. A moving object is an apparatus or a device which includes, for example, a drive mechanism such as an engine or a motor, a steering mechanism such as a handle or a steering, or various electronic apparatuses, and moves on the ground, sky, or sea. FIG. 16A schematically illustrates an automobile 206 which is a specific example of a moving object. The gyro sensor 510 (sensor) which includes the vibrating reed 10 and the circuit device 20 is embedded in the automobile 206. The gyro sensor 510 can detect posture of a vehicle body 207. A detection signal of the gyro sensor 510 is supplied to a vehicle body posture control device 208. The vehicle body posture control device 208 can control hardness of a suspension in accordance with the posture of the vehicle body 207, or control brakes of individual wheels 209. In addition to this, the posture control can be used for various moving objects such as a two-legged walking robot, an airplane, or a helicopter. The gyro sensor 510 can be embedded in a device for realizing the posture control.

Figure 16C:
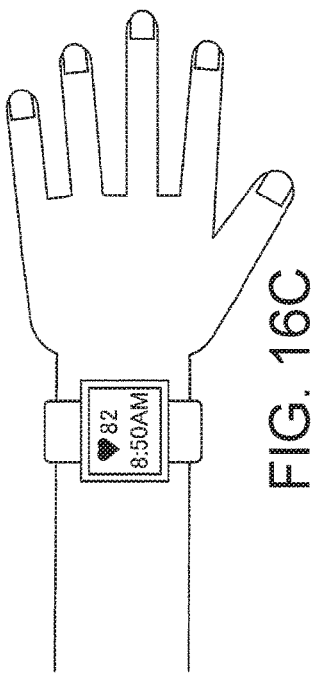

As illustrated in FIGS. 16B and 16C, the circuit device according to the present embodiment can be applied to various electronic apparatuses, such as a digital still camera or a biological information detection device (wearable health apparatus, for example, a pulsimeter, a pedometer, an activity meter, or the like). For example, a digital still camera can hand shake correction or the like using a gyro sensor or an acceleration sensor. In addition, a biological information detection device can detect a user's body movement or detect a motion state using a gyro sensor or an acceleration sensor. In addition, as illustrated in FIG. 16D, the circuit device according to the present embodiment can also be applied to a movable portion (an arm or a joint) or a main body portion of a robot. The robot can be assumed to be a moving object (running robot or walking robot) or an electronic apparatus (non-running robot or non-walking robot). In a case of a running robot or a walking robot, the circuit device according to the present embodiment can be used for, for example, autonomous running.

While the present embodiments are described in detail as above, it can be understood for those skilled in the art that various modifications can be made without substantially departing from the novelty and effects of the invention. Hence, such modifications are all included in the scope of the invention. For example, in the specification and drawings, the terms (angular velocity information, angle information, rotation number information, vibrating reed, gyro sensor, or the like) described at least once with different terms (physical quantity information, after-arithmetic physical quantity information, angular velocity sensor element, physical quantity detection device, or the like) with broader or the same meaning can be replaced with terms different from those, in any place of the specification and drawings. In addition, the configuration of the circuit device, the physical quantity detection device, the electronic device, or the moving object, and the structure of the vibrating reed are also not limited to the devices described in the present embodiment, and various modifications can be made for those.

The entire disclosure of Japanese Patent Application No. 2015-031649, filed Feb. 20, 2015 is expressly incorporated by reference herein.

What is claimed is:

1. A circuit device comprising:
   a detection circuit which outputs angular velocity information, based on a detection signal from an angular velocity sensor element; and
   an output unit which outputs rotation number information of fixed-point notation that is obtained based on the angular velocity information,
   wherein the output unit can output an integer part of the rotation number information as an integer part of the fixed-point notation, and can output a decimal part of the rotation number information as a decimal part of the fixed-point notation,
   wherein the output unit includes multiple output modes, and
   wherein the multiple output modes include a first output mode in which the output unit outputs the integer part of the rotation number information and the decimal part of the rotation number information.

2. The circuit device according to claim 1, wherein the multiple output modes include a second output mode in which the output unit outputs the integer part of the rotation number information, and the output unit does not output the decimal part of the rotation number information.

3. The circuit device according to claim 1, wherein the multiple output modes include a third output mode in which the output unit does not output the integer part of the rotation number information, and the output unit outputs the decimal part of the rotation number information.

4. The circuit device according to claim 1, wherein the multiple output modes include a fourth output mode in which the number of bits of the decimal part of the rotation number information is reduced and is output by the output unit.

5. The circuit device according to claim 1, further comprising:
   a register unit,
   wherein the register unit includes a mode switching register which switches the multiple output modes.

6. The circuit device according to claim 1, further comprising:
   a register unit; and
   a control unit,
   wherein the register unit includes an information register which stores the rotation number information, and
   wherein the control unit performs processing of reading the rotation number information from the information register in accordance with a read command, and performs processing of resetting an integration processing unit of the arithmetic processing unit to an initial state in accordance with a reset command.

7. The circuit device according to claim 6, wherein the control unit performs processing of resetting the integration processing unit of the arithmetic processing unit to an initial state, if the rotation number information is read in accordance with a read command.

8. The circuit device according to claim 1, wherein, if the number of bits of the decimal part of the rotation number information is set to n bits, a value which is obtained by multiplying an integer that is represented by the n bits and $360/2^n$ is angle information which is obtained based on the angular velocity information.

9. The circuit device according to claim 1, wherein the output unit outputs the rotation number information as serial data.

10. The circuit device according to claim 1, further comprising:
    an arithmetic processing unit which performs arithmetic processing based on the angular velocity information from the detection circuit and outputs the rotation number information.

11. The circuit device according to claim 10, wherein the arithmetic processing unit performs the arithmetic processing for the angular velocity information of floating point notation, and outputs the rotation number information of fixed-point notation.

12. The circuit device according to claim 10, wherein the arithmetic processing unit performs integration processing based on the angular velocity information as the arithmetic processing, and outputs the rotation number information.

13. The circuit device according to claim 10, further comprising:
a drive circuit which drives the angular velocity sensor element,
wherein the arithmetic processing unit performs the arithmetic processing, based on the angular velocity information from the detection circuit and time interval information which is defined by a drive frequency of the drive circuit.

14. The circuit device according to claim 10, further comprising:
a drive circuit which drives the angular velocity sensor element,
wherein the arithmetic processing unit performs the arithmetic processing, using an arithmetic coefficient in which a value based on a drive frequency of the drive circuit is set.

15. The circuit device according to claim 14, wherein the arithmetic processing unit performs the arithmetic processing, using the arithmetic coefficient in which a value based on the drive frequency and setting sensitivity of the angular velocity information is set.

16. A physical quantity detection device comprising:
the circuit device according to claim 1; and
the angular velocity sensor element.

17. An electronic apparatus comprising:
the circuit device according to claim 1.

18. A moving object comprising:
the circuit device according to claim 1.

19. A circuit device comprising:
a detection circuit which outputs angular velocity information, based on a detection signal from an angular velocity sensor element; and
an output unit which outputs rotation number information of fixed-point notation that is obtained based on the angular velocity information,
wherein the output unit can output an integer part of the rotation number information as an integer part of the fixed-point notation, and can output a decimal part of the rotation number information as a decimal part of the fixed-point notation,
wherein the output unit includes multiple output modes, and
wherein the multiple output modes include at least two output modes, among a first output mode in which the output unit outputs the integer part of the rotation number information and the decimal part of the rotation number information; a second output mode in which the output unit outputs the integer part of the rotation number information, and the output unit does not output the decimal part of the rotation number information; a third output mode in which the output unit does not output the integer part of the rotation number information, and the output unit outputs the decimal part of the rotation number information; and a fourth output mode in which the number of bits of the decimal part of the rotation number information is reduced and is output by the output unit.

* * * * *